United States Patent [19]
Martino, II

[11] Patent Number: 5,983,265
[45] Date of Patent: Nov. 9, 1999

[54] SYSTEM FOR CONTROLLING ELECTRONIC MESSAGING PROTOCOL BETWEEN PLURALITY OF COMPUTER SYSTEM BY USING IDENTICAL ELECTRONIC MESSAGING SYSTEM

[75] Inventor: John A. Martino, II, Rockport, Mass.

[73] Assignee: Paradigm4, Inc., Hartford, Conn.

[21] Appl. No.: 08/954,772

[22] Filed: Oct. 20, 1997

Related U.S. Application Data

[63] Continuation of application No. 08/594,512, Jan. 31, 1996, Pat. No. 5,680,551, which is a continuation of application No. 08/141,344, Oct. 21, 1993, abandoned.

[51] Int. Cl.$^6$ ................................................. G06F 13/00
[52] U.S. Cl. ......................................................... 709/206
[58] Field of Search ........................... 395/200.3, 200.31, 395/200.36, 200.55, 200.56, 200.6; 709/200, 201, 202, 206, 217, 218, 219, 220, 221, 222, 223, 224, 227, 228

[56] References Cited

U.S. PATENT DOCUMENTS

| | | | |
|---|---|---|---|
| 4,745,599 | 5/1988 | Raychaudhuri | 370/348 |
| 5,138,615 | 8/1992 | Lamport et al. | 370/400 |
| 5,167,035 | 11/1992 | Mann et al. | 370/250 |
| 5,187,787 | 2/1993 | Skeen et al. | 395/680 |
| 5,218,697 | 6/1993 | Chung | 709/203 |
| 5,309,433 | 5/1994 | Cidon et al. | 370/390 |
| 5,317,568 | 5/1994 | Bixby et al. | 370/401 |
| 5,329,619 | 7/1994 | Page et al. | 709/227 |
| 5,329,623 | 7/1994 | Smith et al. | 380/4 |
| 5,341,478 | 8/1994 | Travis, Jr. et al. | 709/219 |
| 5,680,551 | 10/1997 | Martino, II | 709/206 |
| 5,787,251 | 7/1998 | Hamilton et al. | 709/206 |
| 5,844,980 | 12/1998 | Patel et al. | 379/266 |

OTHER PUBLICATIONS

International Search Report for International Application No. PCT/IB 94/00322.
Local Area Network Server Remote Application Programming Interface Support, IBM Technical Disclosure Bulletin, vol. 34, No. 7A, Dec. 1991.
System Network Architecture Application Programmer Interface, IBM Technical Disclosure Bulletin, vol. 31, No. 4, Sep. 1988.
A.S. Tanenbaum, *Computer Networks*, Prentice–Hall, Inc., Second Edition (1989), pp. 453–470.

*Primary Examiner*—Moustafa M. Meky
*Attorney, Agent, or Firm*—Brown Raysman Millstein Felder & Steiner LLP

[57] ABSTRACT

A novel method of and system for heterogeneous connectivity and universal and generic interfacing for distributed applications and processes residing in a wide variety of computing platforms communicating over varied transport facilities, through an integrated set of lower-level programs and routines that handle specific services (message/data recovery, security, directory services, etc.) available from applications and processes within varied complex computing and communications environments, and without having to deal with the idiosyncrasies of differing networks, protocols, devices, multiple "standards", routing, recovery and other transport difficulties and differences. This is effected by novel single-function software modules or verbs, called application programming interface (API), that together provide a consistent and universal interface through which application programs/processes can access the messaging communications services in a manner that isolates the applications and processes from the confusing and fast-changing communications environment, as well as from differences in various computer operating systems, platforms and hardware.

20 Claims, 19 Drawing Sheets

SYSTEM FOR CONTROLLING ELECTRONIC MESSAGING PROTOCOL BETWEEN PLURALITY OF COMPUTER SYSTEM BY USING IDENTICAL ELECTRONIC MESSAGING SYSTEM

This is a continuation of application Ser. No. 08/594,512, filed on Jan. 31, 1996, now U.S. Pat. No. 5,680,551 a continuation of application Ser. No. 08/141,344, filed Oct. 21, 1993, now abandoned.

The present invention relates to electronic messaging systems and techniques for providing messaging services between applications and processes, being more particularly concerned with providing a universal or generic approach for interfacing distributed applications and processes residing in a wide variety of computing platforms, and enabling communicating over one or more transport facilities as desired—providing for use within a multi-media, multi-platform and multi-network computing and communications environment.

BACKGROUND OF INVENTION

Though the term "electronic messaging" has come often to be interperted as synonymous with "electronic mail", in the context of the present invention and this application, the term "messaging" is used in a much broader sense encompassing also any type of content; namely, the encapsulation of any data objects—text, graphics, data, digitized voice or image or the like—together with delivery, utilization and identification information that is needed to produce at each final destination, those activities specified by the encapsulated content.

Heretofore, individual and specially tailored software has been required for interworking and integrating distributed applications and processess and linking stand alone applications. The different computer platforms nave required differently designed data/message transfer treatment and linking programs and processes running in a variety of environments and with a variety of communications types or media, all specifically tailored to the particular equipment networks and protocols—and each being restricted to and useful for its environment only.

Underlying the present invention is the surprising discovery that despite such wide and often disparate variety of equipments, networks, protocols, platforms and communications techniques and environments, each requiring its individualized treatment, there can be a universality or generic approach to the programmatic interfacing or underlying message/data transport and recovery services that can indeed provide consistent, seamless and transparent connectivity betweeen applications and for processes residing in widely different computer platforms linked by a variety of different networks and protocols. This is referred to herein as heterogeneous connectivity for distributed applications and processes, with the electronics messaging systems concept of the invention being referred to as "EMS".

The highly novel approach of the present invention to attain this seemingly impossible task resides, in part, in an integrated set of software lower-level programs and routines that handle specific services-message/data recovery, security, directory services, etc., available from applications and processes within varied complex computing and communications environments, and without having to deal with the idiosynchrasies of differing networks, protocols, devices, multiple "standards", routing, recovery and other transport difficulties and differences. This is effected in EMS, by isolating applications and processes from the increasingly confusing and fastchanging communications environment, as well as from differences in varying computer operating systems, and platforms and hardware.

The inherent problems underlying implementing communications programs between computer systems, make it very difficult to handle all of the idiosynchrasies of different hardware, operating environments, protocols, and networks. Maintaining appropriate software as operating systems are upgraded and new communications features come to market is nearly impossible—especially when communications are embedded in application programs.

To obviate these difficulties, EMS has undertaken to provide:

a) message/data queuing and communications services separated from application programs and processes;

b) specifics of hardware and operating environment services facility; and c) stable, consistent interface between applications and the communications environment that does not change every time a network or computing platform is added, changed or removed.

The invention achieves a solution to this increasingly common, complex and costly problem through insulating both the developer and the user from the vagueries of the communications facilites and networks and from the specifics of the operating environment and hardware. EMS also provides access to the widest variety of communication facilities. In addition, EMS tracks the status of a message, and, depending on the facilites on the receiving side, can guarantee delivery to the destination application.

Through the novel approach of the EMS technique, a middleware toolkit is provided consisting of a programmatic interface and underlying message/data transport and recovery services that together provide the before-described consistent, seamless and transparent connectivity between applications and/or processes that reside in different computer platforms linked by different networks and protocols. The term "middleware" is used to connote a layer of software located between the networks, protocols and transport facilities available on a computing platform, and the applications or processes that require transport of messages and data to and from applications and processes on different computing platforms. The integrated set of lower-level programs and routines that handle specific services-message/data recovery, security, directory services—within a complex computing and communications environment and that constitutes the "tool kit", enable Guaranteed data/message transfer—managing the transmission and receipt of messages and data so as to ensure absolutely that these are received by the intended destination;

Most communications media supported—types of communication; media supported range from asynchronous dial-up modem communications to wireless RF services, such as ARDIS and RAM. Where there is a choice of media to use, EMS assists in deciding which one to employ.

Most popular computing platforms supported—EMS software runs on most of the popular computing platforms to enable developers to link programs and processes running in a variety of environments.

Present day data communication systems mandate one type of protocol to get all the data across. The present invention, on the other hand, provides a scheme at the communication layer that allows for the management of multiple communication facilities simultaneously. Upon losing one communication facility type, another communication facility type can be picked up to continue the sending of information. A management facility that manages what is called communication agents, attached to each type of com-munications facility, recognizes when and what is available to be able to transmit data. It takes a packet of information, regardless of whether it all belongs to one message or is in different messages, stages it for delivery, and hands it off to the proper communication port that is available at that point in time, moving the data through in a continuous pipe or stream. By segmenting the message into logical units of data related to one another by headers, if a communications facility, (for example TCPIP) is lost after one segment is sent, any other routes or communication facilities available to the environment are identified, and the next piece of data will accordingly be sent along such, following preset guide-lines. An upper layer protocol recognizes that data is related, but that it has been fragmented, sometimes oddly. It must be interperted, extracted and fitted together. Just as when analyzing proteins in genetics, when fracturing, it is desired to know what is missing from the chain so as to rebuild the chain to create the gene. In similar fashion,in accordance with the invention, a piece of missing data that fits in somewhere within the data chain can be requested by the receiving end from the transmitting end, no matter what the protocol that is being used, enabling inter-disbursement of the movement of information or packets that belong to a single unified piece of information—and across multiple paths and communication types, from end to end, and without the application having to know anything about the communications facilities. Additionally, the present invention can run on multiple operating systems with exactly the same interface being presented to the application or the process or the user of the system. All of the specific devices, communications facilities and memory management are hidden from the users, providing a novel minimal consistent communication environment sitting on top of the operating system and facility.

OBJECTS OF INVENTION

An object of the present invention, accordingly, is to provide a new and improved method of and system or apparatus and controlling software for electronic messaging that provides heterogeneous connectivity and a measure of universal or generic interfacing for distributed applications and processes residing in a wide variety of different computing platforms, communicating over one or more different transport facilities.

A further object is to provide such universal connectivity through the technique of isolating applications and processes from the communications environment with an integrated set of lower-level programs and routines that handle specific services-message/data recovery, security, directory services, etc.—within complex computing and communications environments without dealing with the idiosyncrosies of differing networks, protocols, devices, multiple "standards", routing, recovery and other transport problems.

Other and further objects will be explained hereinafter and are more particularly delineated in the appended claims.

SUMMARY

In summary, however, from one of its broader aspects, the invention embraces a method of electronically messaging between computers by heterogeneously and universally interfacing distributed applications and processes residing in a wide variety of differing computer platforms and communications transport facilities of various types, that comprises, providing a set of single-function software modules controlled by a preselected set of verbs that together provide a consistent application programming interface between the application/process and the communications facility and through which application programs/processes can access the electronic messaging; under the control of the set of module verbs, first queuing and routing messages and data flowing from and to the sending and receiving computer applications/processes and monitoring the delivery status thereof, and then communicating the routed messages and data through a communication agent for each communication transport facility; and providing common messaging functions for all communication agents independently of and without user concern for the specifics of the various communications facilities and their characteristics.

Preferred and best mode designs and details of system construction and operation and modified forms thereof are later presented.

DRAWINGS

The invention will now be described with reference to the accompanying drawings, FIG. 1 of which is a block diagram schematically illustrating the EMS messaging services and functions in accordance with a preferred embodiment of the invention;

Figure 1A:
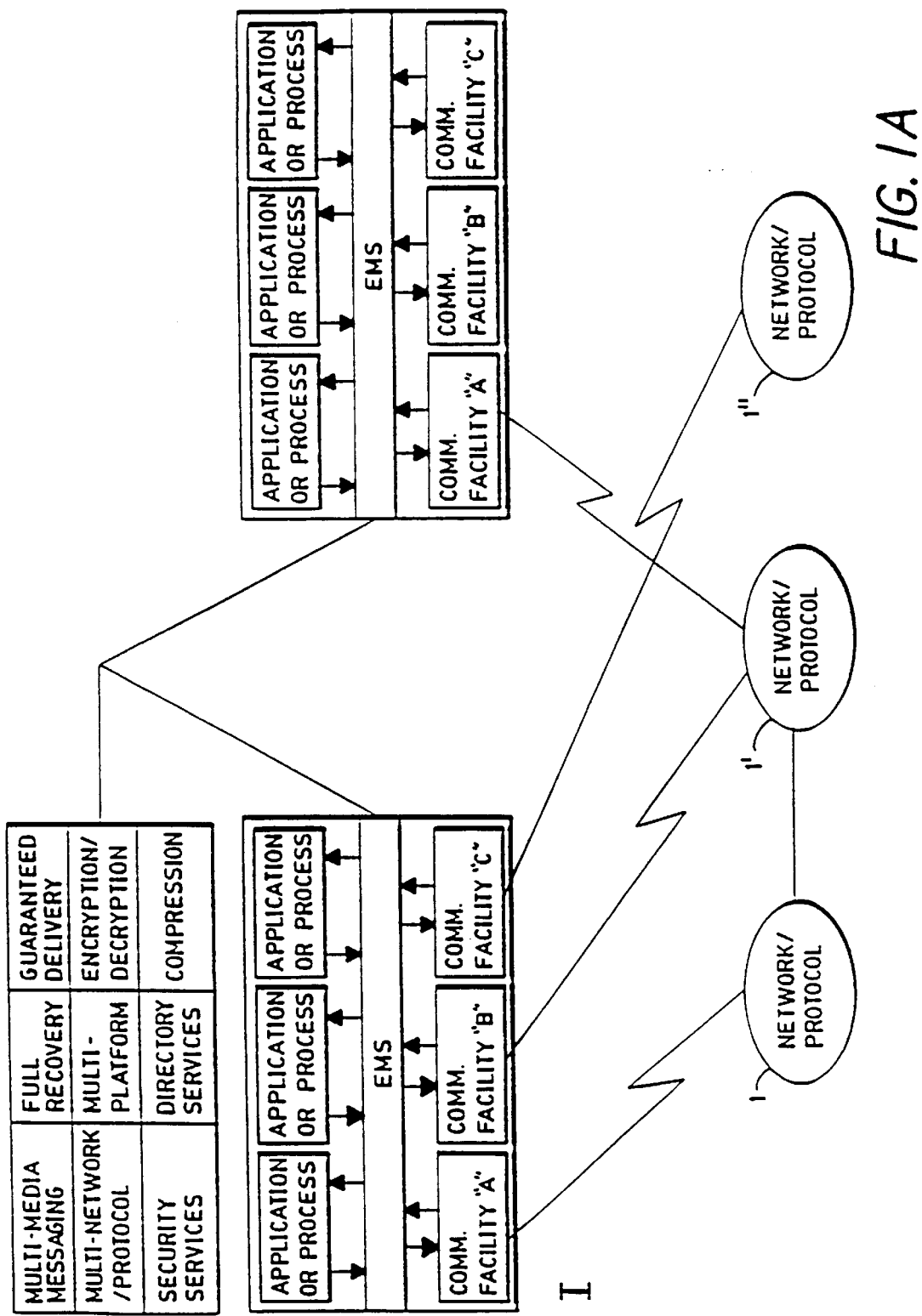

FIGS. 8 through 17 are operational flow charts of steps carried out by the software in effectuating the API control verbs COMMIT, DELETE, FREEBUF, GETBUF, INITIALIZE, PURGE, RECEIVE, SEND, STATUS and TERMINATE, respectively; and FIG. 18 is a chart summarizing the current heterogeneous connectivity features of the present constructions of the invention for a variety of existing commercial platforms and communication protocol/ network systems.

DESCRIPTION OF PREFERRED EMBODIMENT (S) OF INVENTION

It is now in order to describe how the novel results of the present invention are attained in integrating into each application that will use EMS messaging services three main steps. First, designing a messaging user interface to each particular application/process that satisfies the requirements of its users, and which determines how the particular programs will utilize EMS messaging capabilities. Secondly, integrating EMS into each application/process using EMS application programming interface (API) verbs. In general, this requires only the loading of a data buffer with message and message processing instructions and calling the appropriate verb, with linking procedure on the particular platform providing access to the EMS application programming, interface verbs. Thirdly, configuring and testing EMS, using appropriate testing guidelines. In general, the manner in which EMS is used will be the same across all platforms and environments, differing only where platform requirements make such differences unavoidable.

The technique or method underlying the invention provides all of the tools needed for intelligent delivery of data between applications and processes by a simple, consistent programmatic interface rather than dozens of network, protocol and device complexities. If communicating applications or processes change from mainframe to a Unix box, no change is required for applications and processes. EMS simply uses the change in address to redirect data and messages through the new set of interfaces.

A full range of queuing, communications and related services are accessible through EMS, but these can be selected and used only as needed. In each computing environment, the EMS API calls remain the same, so that no changes to the calls are required when migrating from one platform to another. The invention, moreover, supports most of the major wireless services, media and protocols as well as those on wireline networks, allowing developers to use EMS as a tool for integrating applications and processes that communicate across multiple networks.

More specifically, EMS provides a single, consistent programmatic interface to access the queuing, communication and related services for multiple external and internal communication networks, protocols and transport facilities. Neither the user nor the application developer needs to be concerned with the specifics of various communications and network protocols and the characteristics of hardware devices. EMS, indeed, supports both wireline (dial-up, dedicated line, and LAN) and wireless (radio frequency—RF and cellular) connection devices. These interfaces may be internal to the user organization or to public or private networks. Communication among processes on the same computer are always supported. The communications interfaces, moreover, may be installed in any combination for which they are available in that environment, supported by the hardware and operating system, and providing a unique common message switching application across this breadth of operating environments. EMS automatically selects the proper communications medium to use, although the user may override the default section. In either case, ENLS takes care of all the message and network-level protocols on behalf of the user and/or application, providing transparent communications selection and operation.

As before stated, the invention handles both outgoing and incoming queuing of data or messages on behalf of the application or process. This means that the user does not have to wait for a communications mechanism or facility to become available to send data or messages. Similarly, data/messages can be received in background while this or other applications and processes are running. As appropriate, both memory and disk queuing are supported to provide for automatic restart.

EMS, furthermore, is configured at installation time with various defaults. It may be reconfigured at any time without shutting down either the application or process or EMS itself.

Figure 1B:
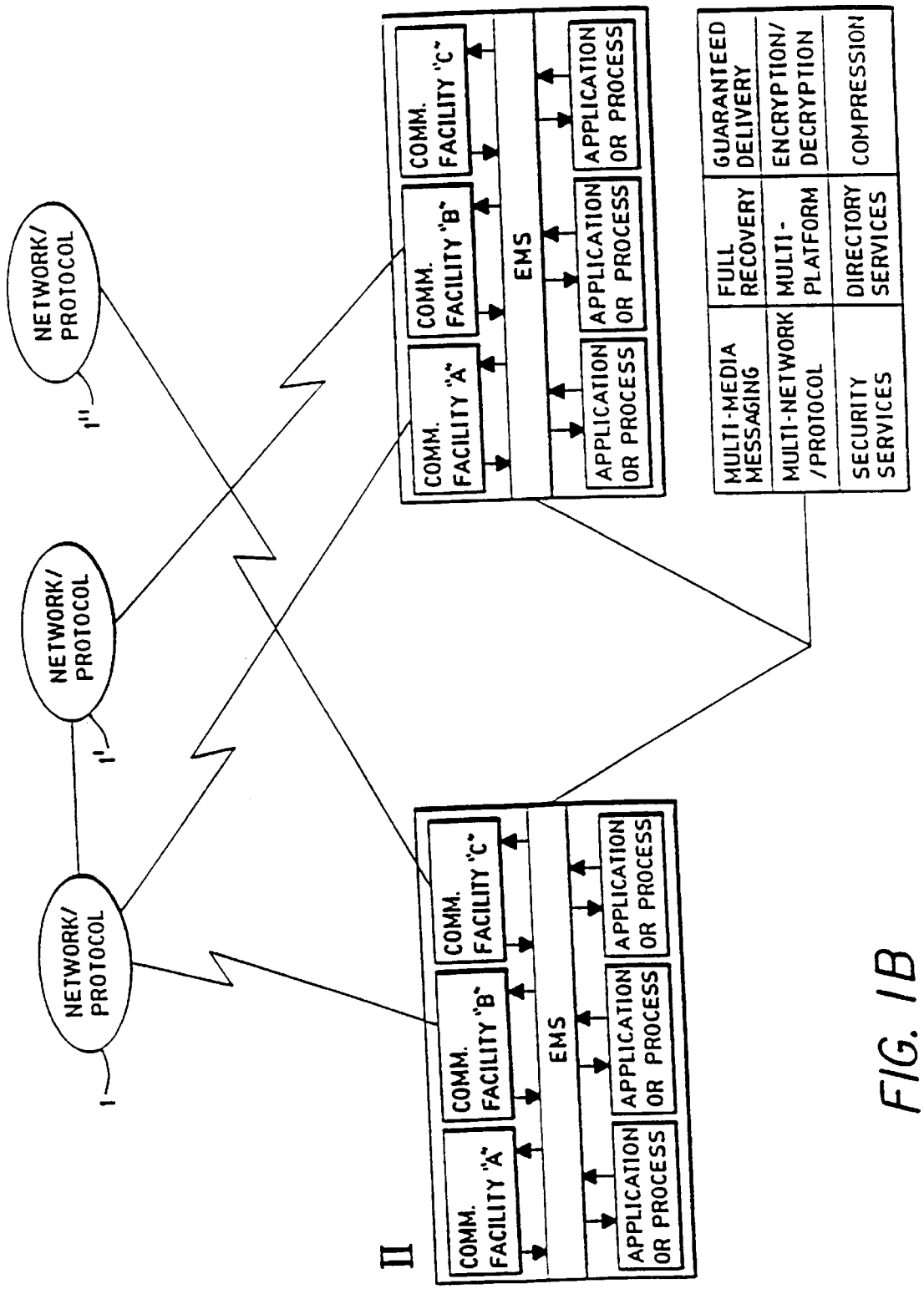

Referring to FIG. 1, EMS is shown installed in a simple system with two different environments I & II communicating across three separate network/protocol facilities 1, 1' and 1". The basic internal structure of EMS, interfacing multiple applications or processes, so labelled, and various communications facilities A,B and C, is shown comprising multi-media messaging, multi-network protocol, security services, full recovery, multi-platforms, directory services, guaranteed delivery, encryption/decryption and compression functions, later more fully described.

As previously mentioned, the EMS for each environment consists of a set of toolkit modules tailored specifically for that environment. As more particularly shown in FIG. 2, the basic EMS modules are the following:

Application Programming Interface labelled (API)—a set of single-function software modules, or verbs, that together provide a consistent interface through which application programs/processes can access the EMS communications services.

Queue Manager/Router ("Queues"/"Router")—stages messages and data flowing to and from the application/process and monitors the delivery status of each.

Communication Agents ("Comm. Agent" or "CA")—one for each different network, protocol or communication transport facility. (shown as "Communication Network" "A" "B" & "C").

Communication Manager ("Comm. Manager" or "CM")—provides common messaging functions for all the communications agent present.

Configuration Manager ("Config. Mgr." or "CFM")—supports dynamic reconfiguration of EMS; automates the decisions for which communication medium and port to use and monitors availability of communications facilities.

Configuration Utility ("Config.")—assists in software set-up and installation.

User Status Utility ("USU")—allows the user to view queues and other status. User Configuration Utility ("UCU")—allows user to manage available communications resources.

Any number of nodes may be linked by communications networks and facilities using the EMS of the invention.

Considering, now, each of these modules in more detail, the application programming interface API, as before stated, consists of a set of verbs provided as callable routines for user programs. There are preferably three basic verbs in the API corresponding to the three main functions required to handle message transfer and receipt:

---
SEND
RECEIVE
COMMIT
---

The function of the COMMIT verb is to finalize the message receive process once all segments of the message have been confirmed as received by the destination EMS. In addition, four message utility verbs are provided to help manage messages and message queues:

---
PURGE
DELETE
STATE
STATUS.
---

A final set of four environment utility verbs handle essential functions related to resource allocation and deallocation:

INIT
TERM
GETBUF
FREEBUF

Together, these few verbs are able to provide a powerful, flexible and consistent programmatic interface across multiple environments.

Figure 2:
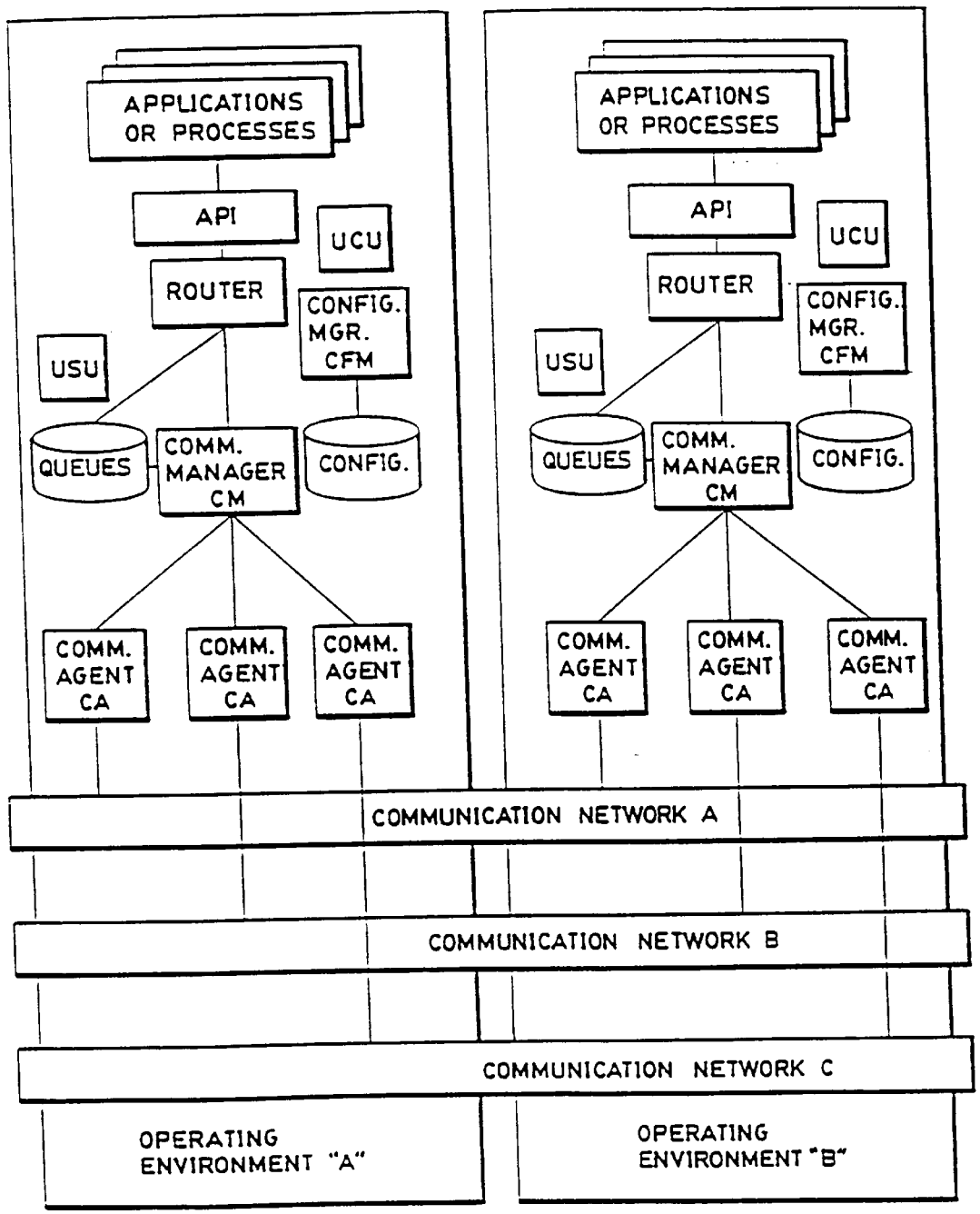
FIG. 2 is a similar diagram illustrating the messaging system of the invention within a communications environment.
Figure 4:
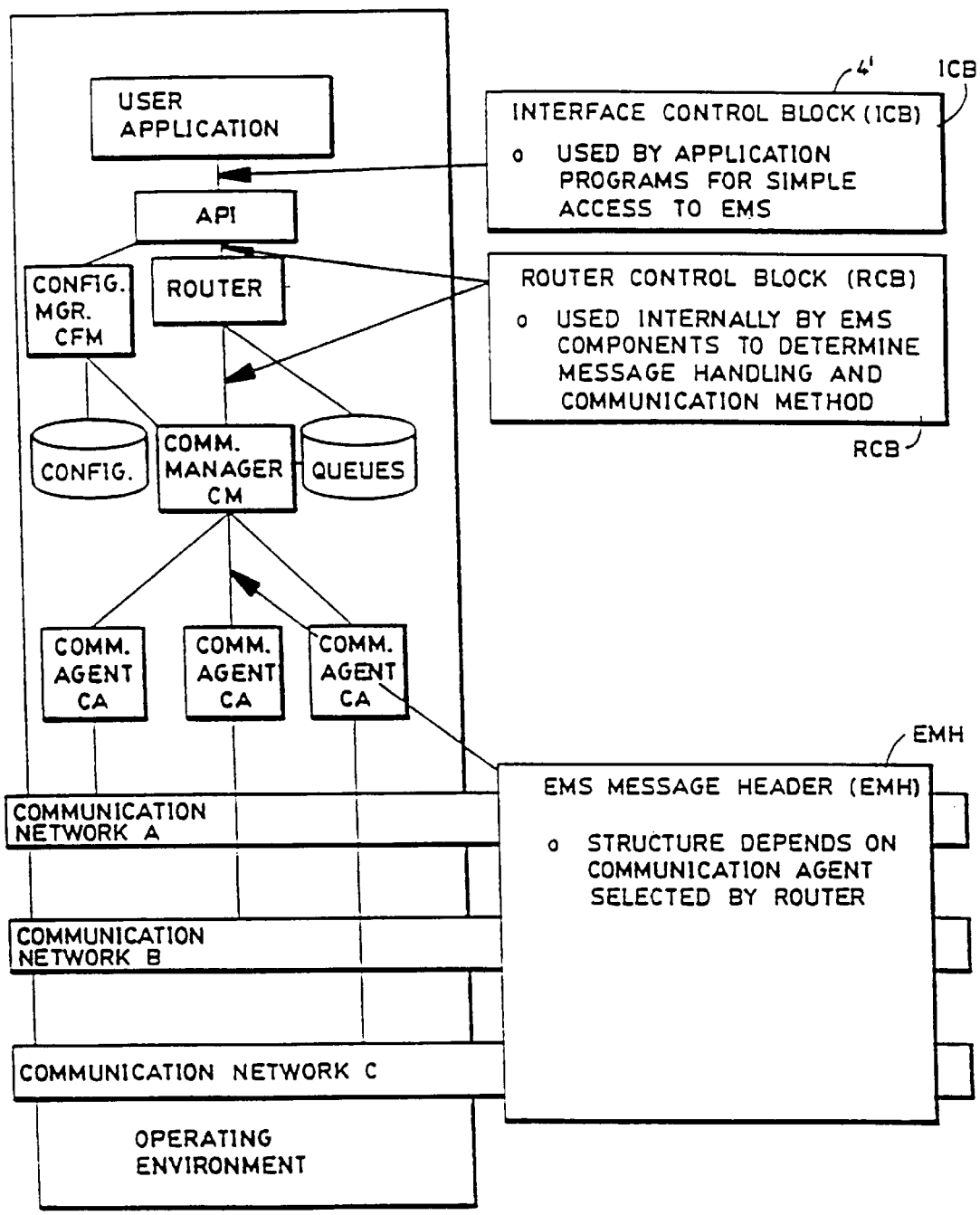
FIG. 4 is a diagram similar to FIG. 2, but showing the message header (EMH), router control block (RCB) and interface control block (ICB) locations.

The Router of FIGS. 2 and 4 is a background process which runs in support of API calls for data and message transmission, delivery and status, and as a server for the User Status Utility. The Router manages both disk-based and memory-based queues (for outgoing and incoming data/messages) and sets event flags, depending on the environment, to notify applications of message status changes. It also manages timed events for messages in progress, again depending upon the environment.

On startup, it rebuilds its queues from the disk-based save files. On shutdown, it stores messages which have not been completed and which have been designated as saveable to the disk save files.

For incoming messages, if the application for the designated user is not active, the EMS Router may request the EMS Configuration Manager CMF to start the application process so that the incoming message can be delivered.

Each Communication Agent (CA), FIG. 2, is specific to the communications hardware and network to which it will attach and to the particular EMS operating environment. Each CA is structured in similar manner to handle the line, RF device or other transport facility. On the EMS side, it passes messages to and from the Communications Manager (CM). Each CA, moreover, may operate as a driver or as an independent process, depending on the operating environment.

As for the Communications Manager (CM), this component provides a set of common routines or independent processes used by all of the communication agents. The CM strips or adds any required control data for the environment to the received message (may contain network control data and message contents). The CM, furthermore, may be an independent process or a library (i.e. a Dynamic Link Library—DLL) depending on the environment in which EMS is installed.

The User Configuration Utility (UCU) of FIG. 2 provides an environment-specific process for the person maintaining EMS to install and maintain the various parameters EMS employs to manage the communication resources available. UCU is run as a major part of the installation procedure to provide the initial defaults to the system. It may then be run on demand to up-date the defaults and to introduce new facilities and routing.

Lastly, Configuration Manager (CFM) is a background process (or common library routines, depending on the platform) which runs in support of the Router, the User Status Utility (USU), and the User Configuration Utility (UCU). The CFM accesses configuration file(s)to determine service and communication agent to use for the delivery of a message, and other default parameters. It is also a server process for the environment-specific user utilities. The CFM, indeed, is the "start up" process for EMS, starting up all of the other background processes in the correct order, as well as the appropriate communication agents according to configuration defaults.

Figure 3:
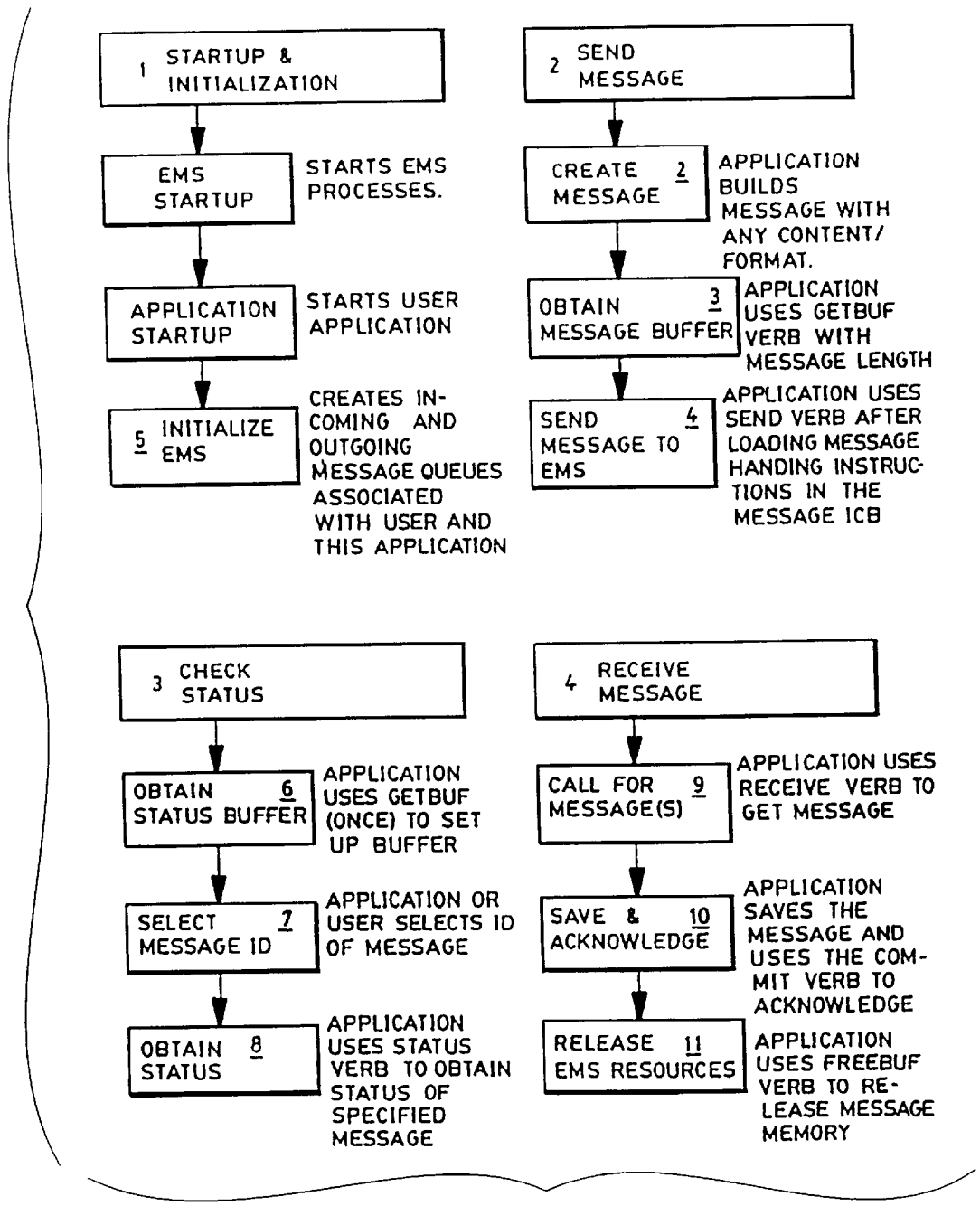
FIG. 3 is a messaging process diagram tracing from (1) start-up and initialization of the EMS systems, through (2) sending messages, (3) checking status, and (4) receive messages.

It is next in order to examine the message flow through the EMS of the invention. FIG. 3 traces the messaging process start-up and initialization, to the sending of the message, the checking of status, and the message receipt.

EMS handles all communications between applications or processes using this message-based datagram approach. An EMS message, as before explained, may be a short text string, a large data file, or a megabyte or more of a multi-media message (text, data, graphics, images, voice and even video). Long messages are segmented by EMS at the destination. Segment length for an EMS message depends upon the network being used for transfer and is optimized accordingly.

Each individual application creates its own message comprising any specific data-string, file, image, etc. as part of its normal processing, as shown at 2 in FIG. 3. Editing and formating of message contents are done by the application or process strictly under its own control. When the application or process is ready to transfer the data/message to an application or process on another computer (or on the same computer), it calls the EMS SEND service at 4. These calls are normally embedded in the application/process by developers and are not seen by application users except as the developer may wish to inform the user of this background activity.

The EMS then formats the message for transfer. When the application or process calls the SEND verb, a message header, called the Interface Control Block (ICB), noted at 4 in FIG. 3 and at 4' in FIG. 4, is built to identify:

the ultimate destination of the message the tag for selecting this particular message the type of special processing required for the message the urgency of the message the special handling characteristics of the message.

EMS then determines, as later explained, the proper medium and transport facility to use to reach the specified destination, taking into consideration defaults set up in the configuration file for both the sender and the destination, the communication agents present, and the status of the various communication devices attached to the user computer. EMS then places the data/message queue and returns control to the application.

When the designated transport facility becomes available, the message is transferred and delivery confirmed. The data/message is transmitted by the Communication Agent CA, FIGS. 2 and 4, associated with that facility and status of the EMS message is updated. If the message requires guaranteed delivery, then EMS will not consider it completed until a positive "commit" message is received from the destination. The message is then delivered to the destination application.

When a message is received by the destination through any of the communications agents,it is queued for receipt by the destination application according to instructions in the later-described EMS message header, "EMH" in FIG. 4. The destination application "asks" for each message either automatically or as the result of a user command. Once the message has been successfully delivered to the destination application, EMS automatically generates a "commit" message back to the sending application (if required by the sender). Message delivery is thereupon con-firmed to the sending application. When the sending copy of EMS receives the "commit" for a message, it automatically releases the queuing resources taken up by the original message, and updates the status for the sending application, automatically freeing the message buffer. Returning to the message processing chart of FIG. 3, and considering the same in conjunction with the message header diagram of FIG. 4 (incorporating the system of earlier-described FIG. 2), the API routines or verbs, callable from the EMS literary structure that is native to the local computing and communications environment, enable the performance of the following functions.

EMS is initialized at 5, FIG. 3, by calling the before listed INIT verb which sets up sending and receiving queues for the calling application/process and for each local communications transport facility (if these queues are not already in existence). Parameters used for initialization are retrieved from a configuration file but may be changed as part of the call. INIT must be called by the application prior to issuing any of the other API verbs.

Before building an outgoing message or requesting status, an application or process must obtain a memory allocation for the message control data and for the message itself by executing the GETBUF verb at 3, FIG. 3. Message control defaults are filled in by GETBUF but may be altered by the caller. GETBUF returns pointers to both the message control data and the message data area. Incoming EMS messages also require allocation of memory before they can be passed to the destination application or process. The EMS receive verb RECV (at 9, FIG. 3) automatically calls GETBUF in this case.

To send a message, the application program or process executes the SEND verb at 4 after making any desired changes to the message control data and inserting the length of the data or message being transmitted. EMS checks the message control data as a header to the data/message itself and places the combined structure, or EMS message, on the EMS queue to await availability of the required appropriate Communications Agent, CA, FIGS. 2 and 4.

After the application has completed processing message or status response, it should release memory allocated for the message control data and the message data areas associated with the EMS message. Memory for the message control data is freed by executing the FREEBUF verb at 11. After execution of FREEBUF, however, EMS is no longer aware of the message or able to access it. If the application needs to access the message later, the message must be saved by the application at 10.

To receive an incoming message, the application or process executes the RECV verb at 9, FIG. 3. When RECV runs, the EMS Router, FIGS. 2 and 4, provides pointers to the message control data and to the data/message contents for RECV to return to the caller. One message at a time is given to the calling application or process. Following delivery of the data/message, its status in the EMS in the queue is updated. It should be noted that the message, together with its control data, remains on the queue until EMS receives a FREEBUF call (or COMMIT at 10) from the destination application or process. When an application or process which can receive messages starts up, it should immediately issue a RECV call to obtain any waiting incoming data/messages.

For most communications services aid networks supported by EMS, acknowledgment of received data/messages is taken care of by the Communication Manager and Router, FIGS. 2 and 4, automatically on behalf of the destination application. For networks which support application and/or user acknowledgments, however, the application program must call COMMIT (at 10, FIG. 3) to send the back through the network originator.

Applications and processes can obtain the status of an EMS message by executing the STATUS verb at 6–8, FIG. 3. Message status is maintained by EMS in the message control data area of each EMS message stored on the queues.

Applications or processes can find out the state of an EMS queue by executing the STATE verb. A STATE query for a queue returns the number of active items in that queue, and the state of the queue. Individual EMS messages, moreover, may be deleted from the EMS queue by invoking the earlier listed DELETE verb. All items in a queue destined for the same address may be deleted with a single DELETE call. Items designated are deleted regardless of status. If outstanding acknowledgements are received subsequently, the application or process will be notified. The DELETE verb is not used in normal processing. It should be invoked with care only to cancel messages which have not been sent because of extended unavailability of destination systems or communications links.

All items in an application or process queue (either incoming or outgoing) may be discarded by calling the PURGE verb. The purge action takes place regardless of the status of individual messages. The PURGE verb is not used in normal processing. It should be invoked with care and only in error correction situations. (See DELETE.) Before an application or process using EMS ends, it normally calls the before-mentioned EMS API termination verb, TERM. TERM "cleans up" all outstanding messages (incoming and outgoing) for the calling application or process, ensuring that the messages to be saved are properly stored on disk. This includes both application/process created data/messages and EMS administrative or commit messages. If the EMS queues for the application/process are empty, they are deleted. (They will be created again when the application or process starts up or a message is received for the application/process, FIG. 3.)

Figure 5:
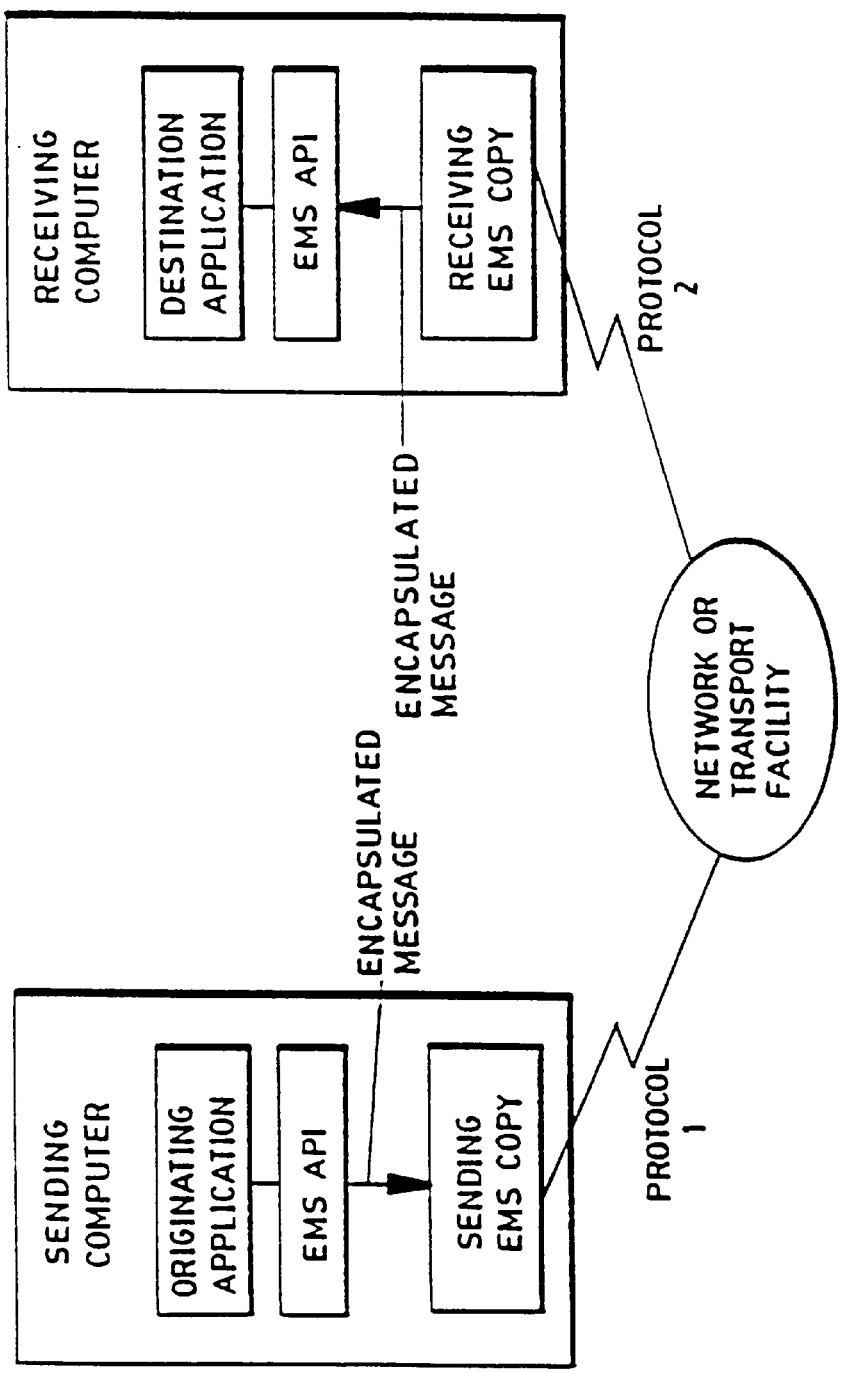
FIG. 5 is a block diagram showing the sending-receiver computer messaging through a network or other transport facility.

In accordance with the invention, EMS encapsulates each message submitted by an application (via the EMS API) for transport across whatever network/protocols EMS is configured to support. Encapsulation involves completing an EMS Message Header (EMH), FIG. 4, for the message data prior to transport and removing the transport specifics from EMH just before delivering the message data to the destination application. This header contains all information necessary for EMS to transfer the message from the originating application and EMS copy to receiving EMS copy and destination application across whatever network/protocol combination that may be required, as schematically shown in FIG. 5.

The EMH is used internally by EMS, as well as by certain networks, to instruct the various processes involved in transfer as to how the message is to be handled, and its format and content may change several times as it moves through the sending EMS, communications networks/protocols and the receiving EMS. Certain fields are dropped when no longer needed; others are compressed or coded to minimize overhead; fields generated within EMS are added for temporary use by certain networks and protocols are removed immediately after they have served this purpose.

The full EMH is also structured according to the message class-of-service; i.e. the message priority, length and requested acknowledgement level. These parameters are used by EMS to determine the path that the message will take (including communications service(s) selection), with the EMH containing only the minimum amount of information needed to support that class-of-service. The EMH for any specific message thus represents a specific class-of-service view of the full EMH—one that may have both different content and different format depending on the handling characteristics, processing stage and communications medium.

In FIG. 4, EMH transformations at the various stages of EMS are shown. The programmer will be concerned only with the fields that specify message handling and end-to-end logical addressing in the Interface Control Block (ICB) portion 4' of the EMH. All other fields in the EMH are handled internally by EMS.

EMS messages can be of any length (subject to constraints of the local operating environment) but most networks and protocols have some limitations on message length. This means that EMS must provide some mechanism for subdividing messages that are too long for the specified communications path and for reassembling the pieces at the destination. In practice, message subdivision may be done in several steps. First, message segmentation. Messages no longer than some nominal limit—usually 32,767 bytes—are segmented upon receipt by EMS prior to being enqueued for transmission. This nominal limit is contained in the EMS configuration files and is also modifiable. Secondly, segment packetization. Most networks and protocols have a maximum length for actual transport (and error correction) and for handling of the transported data internally. Since each protocol has different framing requirements, the EMS software or local operating environment must take care of this final subdivision and formatting. A packet may require several frames to transport in full and receiving component of EMS (or local operating environment) must handle reassembly of frames into packets. This subdivision and reassembly process is transparent to applications and processes that use EMS. EMS, indeed, hides all of the message handling and communications complexity from users and their applications, removing this costly and burdensome task from users.

Figure 6:
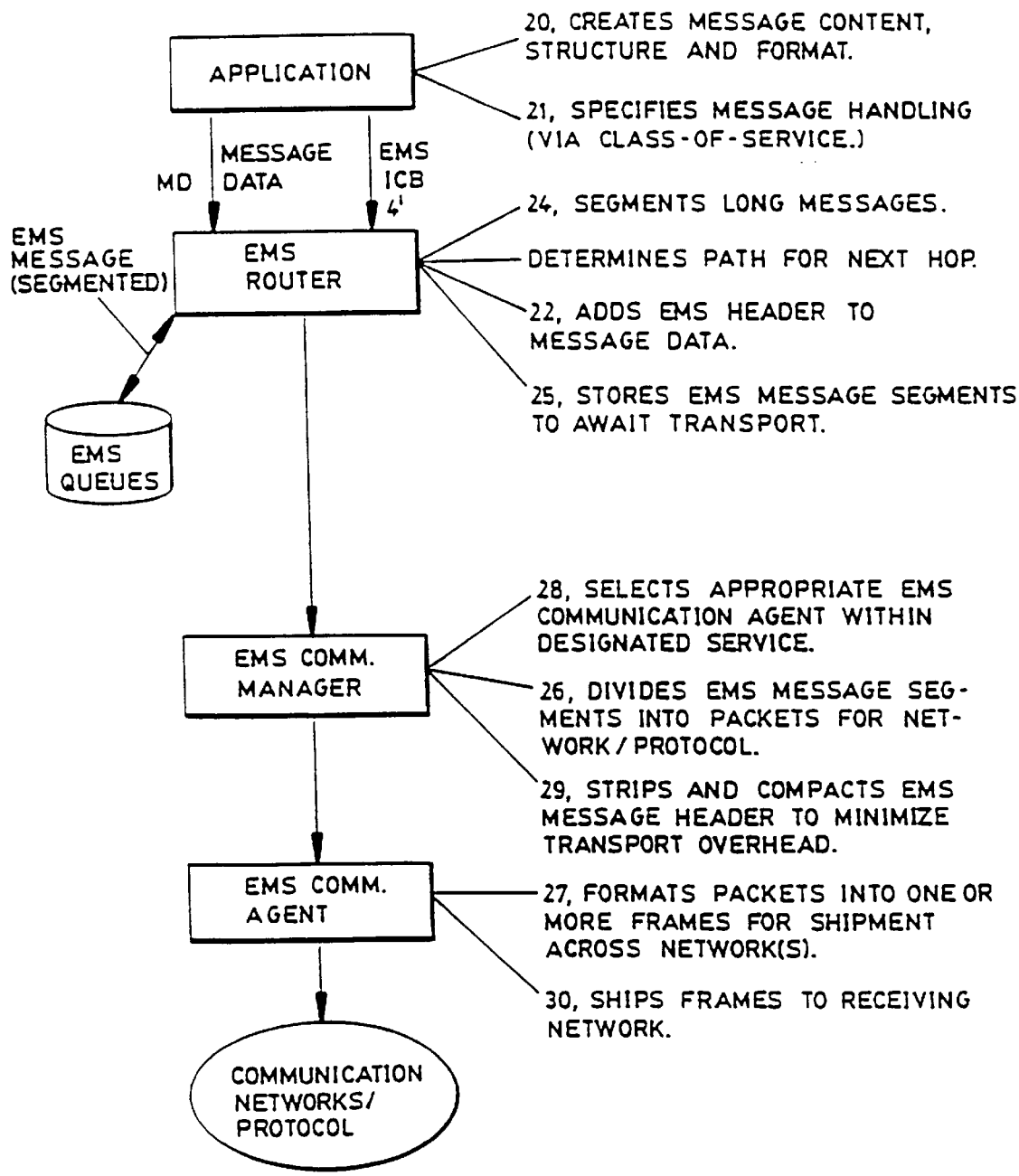
FIG. 6 is a combined apparatus and flow diagram illustrating the outgoing messaging process and steps.

The details of developing outgoing messasges are presented in the flow chart of FIG. 6 which outlines the main steps in preparing a message for transmission and in sending that message.

The application, through its normal processing, creates at 20 the block of data to be transferred. This data block or message MD, as previously explained, may have a simple structure such as text, or it may have a complex internal structure containing binary data, images, text, graphics and other objects that have meaning only to the receiving application. EMS has the job of delivering this message content to a specified destination without loss.

The application (or its user) must also decide at 21 how the message MD is to be handled (this defines the class-of-service for the message). Handling options supported by EMS may include acknowledgement level, priority with regard to other traffic, service routing according to logical destination, identifier, recoverability, retry options, and timing and delayed delivery options.

The message destination must be specified using IDs (7, FIG. 3) that have been established for the user environments. Both message handling and message destination specifications are loaded into a special EMS data buffer—the Interface Control Block (ICB) 4', FIGS. 4 and 6,—before the EMS API function call is made.

After defining both the message data content for EMS (in terms of length and pointer to message data start) and the message handling instructions (via the ICB), the application makes calls to the EMS API to make the transfer. In general, this requires a GETBUF call (3,6 in FIG. 3) to set up the message resources, and a SELND call (4, FIG. 3) to initiate the transmission (depending on the platform). The receiving EMS process is the EMS Router, FIG. 6, or Queue Manager "QUEUES", depending again on the platform involved.

Upon receipt of a message MD, EMS "encapsulates" it by prefixing the message handling data as a message header at 22 to the message data to form the complete EMS message ready for transport. As described before, content, structure and format of data in this header changes as the EMS message moves through the process. Because, as previously explained, EMS is designed to handle messages of any length, longer messages (such as images) must be broken into segments of the maximum size supported jointly by the networks involved, as at 24. In practice, this may be, for example, a 10,000 byte or 32,767 byte size limit so that megabyte-size messages must be broken into many segments. Each segment carries an EMS header and is treated as an independent datagram between the source and destination EMS copies, being stored for transport at 25. The EMS-generated message segments will often require further subdivision, as before detailed, to accomodate network and protocol requirements. The appropriate communication agent is selected at 28, and for actual transport across many networks, messages are broken into the before—described packets of specific length and structure at 26. Error detection fields may be added during the packetization process.

The message packets created by EMS normally undergo a further subdivision into frames at 27, for actual transport. The communication device (modem, port, driver, etc.) and the underlying network layer handle transport at 30 of data frames from a source node to a destination node, often by way of a number of intermediate nodes. Error detection and frame retransmission where errors are detected occur at this level. Since EMS ships only the header data needed by the receiving EMS to handle the message properly, all other header information is stripped prior to transport. Message header data required by certain networks and services are added to the EMS message header in positions, structures and formats required by these such specialized header data is also removed when no longer required.

Figure 7:
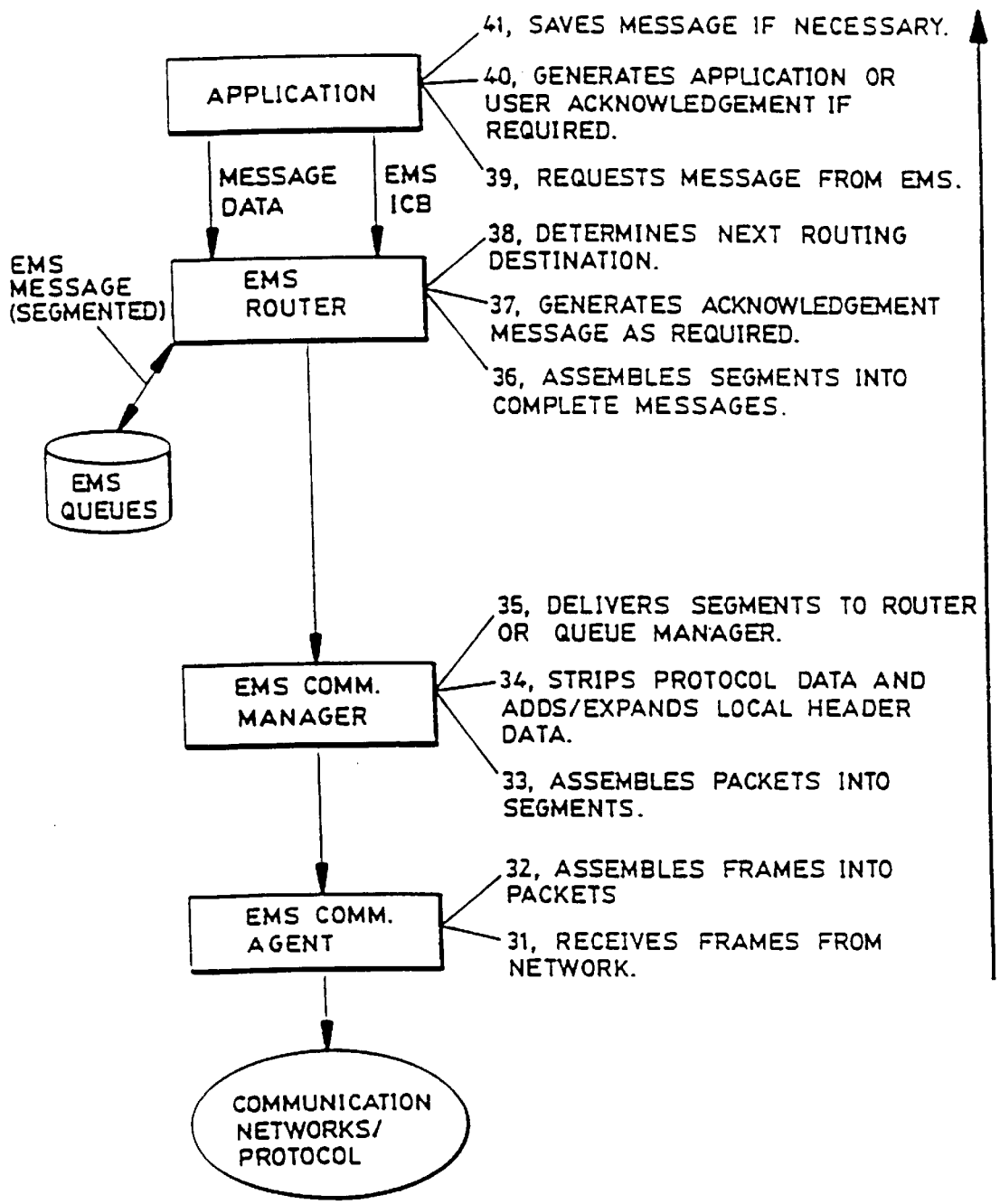
FIG. 7 is a similar diagram of the incoming message processing.

It is now appropriate to consider, in detail, the treatment of the incoming messages sent by the technique of FIG. 6. The principal steps involved in receipt of a message to the destination application are shown in FIG. 7.

The message data, and Frame format, are received at 31 at each EMS—supported node and are reassembled into packets at 32. The transport layer data and structures are removed and the message header is unpacked to its full EMS format. The message packets are reassembled at 33 (segmentation created by the sending EMS is removed) and protocol data stripped and local header data added at 34. The segments are delivered to the local EMS QUEUE or Router at 35, where the complete messages are reassembled at 36 and acknowledgment messages generated, if needed, at 37. On this queue, messages await either delivery at 38 to a local recipient or transmission over the next transport hop. When the destination application or user requests a message from its assigned EMS Queue, using the RECEIVE verb, the message storage area is delivered to the application. Other data contained in the message ICB is also available to the application, if needed. The application can read the message data and display it or store it for the intended user (or application). If the ICB specifies that application or user acknowledgement is required, the receiving application must initiate an appropriate acknowledgement at 40. Formal return receipts are transmitted to the message sender as separate messages. Acknowledgement of receipt internal to EMS is handled by the COMMIT mechanism and does not involve either sending or receiving application. EMS generates the properly formatted messages on behalf of the application.

Messages requiring any processing following delivery to the destination must be processed by the destination application or by an associated module. This responsibility includes saving of messages as at 41 (and of the ICB if necessary). EMS releases all resources involved in message transfer as soon as the receiving application notifies EMS (using the before-described FREEBUF verb or COMMIT verb) that it no longer needs separate access to the message.

Some important implementation details of routing functions for outgoing message handling and other functions will now be addressed. Look up destination routing options may be used, providing possible media and network addresses for the destination (using an address book function) based upon the ICB contents. Such an EMS addressbook may contain a short name by which the user knows the correspondent, the correspondent's expanded name, the correspondent's location or address (description field), the correspondent's city, networks and their associated addresses for the correspondent, routing preferences for this correspondent, owning user or public indicator, compression option, encryption key to correspondent, encryption key from correspondent, and the like.

Message size and the other class-of-service characteristics are evaluated to determine which communication network provides the best route to use for the next hop. This information may be contained in the general routing configuration file having, as contents, maximum message lengths—i.e. 100, 200, 1000, 2000, 10000, 999999—and, by priority, text type (character, binary), and maximum message length.

It is also important to provide for the extraction of new network message information. If the outgoing message is to transverse a processing network (for example, the Motorola MoNet) and the network ID for the destination is not in the addressbook, then it is added to the addressbook. Like all of the other configuration files, the addressbook itself is an editable file and may be completed with other information at a later date. The ID is captured on the fly, however, to simplify later maintenance by the user or administrator.

To complete the EMS message header, proper network, communication medium, next hop and final address (as appropriate) are filled into the ICB and reformatted as needed into the EMS Message Header (EMH), FIG. 4. Only the next hop and final address (as known) are inserted. Each hop along the way determines the medium and addressing for the next hop. This approach means that pathing may vary as necessary and achieves the desirable result that such is totally transparent both to the preceding and succeeding hops and to the initiator and receiver of the message.

Based on the communication medium selected, moreover, the proper communication agent type is selected from the service information file. For each EMS Communication Agent type, a standard template is provided including service name, process driver name, CA class (Express, Bulk, All), type (i.e. ARDIS), device ID (ESN or telephone number), port or network address, start automatically at run time (Y/N), shut down when no applications open (Y/N) (i.e. last TERM), maximum message size (including ICB's but not protocol headers), block/packet size, name of file containing startup command for communications agent, and name of special parameter file (for device/network specific parameters), This is where all of the protocol and device specific information goes and it also uses the keyword formats.

The message is segmented to the maximum message size from the relevant service file entry,as earlier discussed, and the messages are placed on the queue defined by the service. This is "receive" queue for the appropriate EMS Communication Agents. Depending on the platform, the EMS Router notifies the Communication Manager that there is traffic to be sent out on this queue.

Another function for processing outgoing messages is deferred sending, as where the queue management software will delay passing the message to the communications manager until the specified time is reached. If the next hop routing for a message cannot be completely determined, furthermore, the reason for the problem is placed in the ICB return code field. The message is then placed either on the application "receive" queue or the "receive queue" for the application specified as the error process in the EMS header. The application selection is determined from the information in the local message header defaults configuration file, and the queue is selected from the application configuration file.

Further details on the handling functions of the incoming messages are similarly helpful. For identification of the destination queue, the receiving EMS uses the application and destination ID in the ICB attached as part of the EMS Header, FIGS. 3 and 4, to determine the proper queue for the message. The queue name is selected from the application configuration file, if it is present, including such items as application or process name, Queue name, maximum number of copies (as applicable), start flag—if not running when incoming messages received (Y/N), pass incoming commits to application (Y/N), pass incoming network acknowledgments to application (Y/N), permanent queue flag (Y/N), queue by user and application (Y/N)—vs. by application only, outgoing queue size (initialization), incoming queue size (initialization), startup file name (for complete startup command to start process), and text type of message generated (character, binary), etc.

If no application is specified in the incoming message, then the default application for the destination user is selected from the user configuration file. If there is no default application, the message is enqueued only for the user. The received ICB and header is expanded and checked to see if a commit and/or other acknowledgment is required. If the routing functions are to generate these messages automatically before the application receives the message, then the appropriate header information is extracted for use in these datagrams. Depending on the platform, moreover, the routing process will detect true duplicates. These duplicates are identified by the same message ID (which includes segment number). In these rare cases, the second message is considered the duplicate and is discarded since the message database is keyed on message ID.

The message status is set to "received but not yet retrieved from the queue", and the message is enqueued on the "receive" queue for the application. Routing functions determine if a commit or device-level acknowledgment is required for the incoming message from the ICB contents. The commit requirement is determined by the setting of the receipt requested field in the internal portion of the ICB while device acknowledgement requirement is determined from the confirmation mode field in the network portion of the ICB. The commit and/or acknowledgment is not generated until the message is enqueued for the destination application or next hop. This meets the "safe storage" requirement of many missioncritical applications.

As in the case of the outgoing message handling, as above explained, if a message is received via a processing network and the sender's network ID is not in the local addressbook, then it is automatically added. Like all of the other configuration files, the addressbook is an editable file and may be completed with other information at a later date. The ID is again captured on the fly, however, to simplify later maintenance by the user or administrator.

Successful receipt of a message (segment) by a final destination or delivery service is signalled by an acknowledgement message being returned to the sender. There are at least four levels at which the ability to generate receipt acknowledgements are valuable; namely, user (i.e., a person), application, device (EMS) and/or communication protocol. EMS handles device and protocol acknowledgements and, through its API, support application-level and user-level acknowledgements if the application developer elects to provide these. All EMS messages have "network-level" fields to define these important class-of-service options.

Considering the above-mentioned device acknowledgement, an ENS Router that receives a message (segment) will generate a "device acknowledgement" if required and will forward it as a separate datagram back to the message originator via the same path. A device acknowledgement is required if the confirmation mode in the network-related fields in the EMS message Header is set to "device acknowledgement." For example, when the Router at the destination subscriber unit receives an incoming message via a processing service (e.g., MoNet) which has the confirmation mode in the network ICB set to "device acknowledgement", the Router will generate the required device acknowledgement message and forward it as a separate datagram back to the message originator via the same processing service path. An example of the content of such a device acknowledgement is presented in the following Table 1:

TABLE 1

EMS Message Header:
DEVICE ACKNOWLEDMENT - Local ICB Portion

| Field | Content |
| --- | --- |
| Eye Catcher | "CACB" |
| Release | "0300" |
| Message Pointer | Default |
| Message Length | 22 |
| Network ICB Pointer | Default |
| Network ICB Length | Default |
| Destination Fields | Source fields from incoming message |
| Message ID | New ID for the acknowledgement |
| Number of Segments | 1 |
| Mode | Expeess |
| Hop Format | "B" |
| Local Priority | "0" |
| Recovery | "Y" |
| Commit Indicator | "Y" |
| Commit Type | "2" |
| Commit Source | Destination address from incoming message |
| Original Message ID | Messnge ID from incoming message |
| Number of Retries | Default |
| Retry Count | Default |
| Interval | Default |
| Retransmission | "0" |

NOTES:

A destination application may be given the ability to generate an application acknowledgement to confirm the message receipt by having the application issue a COMMIT call to the destination EMS Router. The EMS Router will generate the required application acknowledgement message and forward it as a separate datagram back to the message originator via the same network path. When the destination application issues a COMMIT verb for a message marked for "application acknowledgement" in the confirmation field, the Router will generate the required application acknowledgement message and forward it as a separate data-gram back to the message originator via the same processing service path. A typical application acknowledgement content is shown in the following Table 2:

TABLE 2

EMS Message Header:
APPLICATION ACKNOWLEDGEMENT - Local ICB Portion

| Field | Content |
| --- | --- |
| Eye Catcher | "CACB" |
| Release | "0300" |
| Message Pointer | Default |
| Message Length | 22 |
| Network ICB Pointer | Default |
| Network ICB Length | Default |
| Destination Fields | Source fields from incoming message |
| Message ID | New ID for the acknowledgement |
| Number of Segments | 1 |
| Mode | Express |
| Hop Format | "B" |
| Local Priority | "0" |
| Recovery | "Y" |
| Commit Indicator | "Y" |
| Commit Type | "2" |
| Commit Source | Destination address from incoming message |
| Original Message ID | Message ID from incoming message |
| Number of Retries | Default |
| Retry Count | Default |
| Interval | Default |
| Retransmission | "0" |

NOTES:

A destination application may also be given the ability to generate an acknowledgement confirming message receipt by the receiving user. This requires the application to issue a COMMIT to the destination EMS Router. The EMS Router will generate the required acknowledgement message and again forward it as a separate datagram back to the message originator via the same network path. when the destination application issues a COMMIT verb for a message marked for "user acknowledgement" in the confirmation mode field, the Router will generate the required user acknowledgement message and forward it as a separate datagram back to the message originator via the same processing service path.

A typical user acknowledgement content is shown in the following Table 3:

TABLE 3

EMS Message Header:
USER ACKNOWLEDGEMENT Local ICB Portion

| Field | Content |
| --- | --- |
| Eye Catcher | "CACB" |
| Release | "0300" |
| Message Pointer | Default |
| Message Length | 30 |
| Network ICB Pointer | Default |
| Network ICB Length | Default |
| Destination Fields | Source fields from incoming message |
| Message ID | New ID for the acknowledgement |
| Number of Segments | 1 |
| Mode | Express |
| Hop Format | "B" |
| Local Priority | "0" |
| Recovery | "Y" |
| Commit Indicator | "Y" |
| Commit Type | "2" |
| Commit Source | Destination address from incoming message |
| Original Message ID | Message ID from incoming message |
| Number of Retries | Default |
| Retry Count | Default |
| Interval | Default |
| Retransmission | "0" |

NOTES:

When the EMS Router receives a network acknowledgment message, it uses several fields in the network portion of the EMH to match the acknowledgment to the original outgoing message:

Message ID

Message Tag

Application

Destination/Source ID

Only one level of acknowledgement is received for a message. A message with multiple destinations (list) however will get the same acknowledgement type from each destination which successfully receives the message. If at least one acknowledgement is received, then it is up to the processing network to deliver the rest. Since the expansion of group addresses may take place at the processing network, the source has no way of knowing how many acknowledgements will be received. In this case, the configuration for this application should be set to return acknowledgments to the application for final reconciliation. If, therefore, a network—generated acknowledgment is received for a message which is not on the EMS Router's queues, then the acknowledgment is placed on "receive" queue for the originating user (from the source network ID field in the network-related EMH fields) and application.

In the event that a message cannot be delivered as specified in the EMH, a negative acknowledgment in the confirmation mode field is generated if so requested by the processing network. Gateways in a network complex, furthermore, even if they are EMS-supported, simply pass through acknowledgment messages in the same manner as for any other message (except in the rare case that the Gateway node itself is the destination).

While earlier referred to, it is now in order to explain the details of the EMS Message Commits. The commit, it will be recalled, is an internal message sent from a receiving EMS to the sending EMS to notify the sender that the message at the sending side may be released. This is the mechanism by which EMS is able to guarantee delivery and to recover messages in the event of any transmission loss.

The EMS router issues a commit message to the EMS Communication Manager upon receipt of a message requiring a receipt acknowledgment. The commit is issued after the EMS Router has placed the message safely on the queue for the next destination. This commit, FIG. 3, is passed as an independent datagram (i.e. EMS message) through the EMS Communication Agent back to the previous sending computer EMS Router, serving as acknowledgments between the hops.

Typical content of the EMS Message Header in a commit datagram is shown in Table 4. (All other fields are set to default values.) Commits are not retriable messages, such that if they fail, then the normal message recovery will take over.

TABLE 4

| EMH Field | EMS Message Header: COMMIT |
|---|---|
| | Content |
| Eye Catcher | "CACB" |
| Release | "0300" |
| Message Pointer | 0 |
| Message Length | 0 |
| Network Area Pointer | 0 |
| Network Area Length | 0 |

TABLE 4-continued

| EMH Field | EMS Message Header: COMMIT |
|---|---|
| | Content |
| Destination Fields | Source fields from incoming message |
| Message ID | New ID for the commit |
| Number of Segments | 1 |
| Mode | Express |
| Hop Format | "B" |
| Local Priority | "0" |
| Recovery | "Y" |
| Commit Indicator | "N" |
| Commit Type | "1" |
| Commit Source | Destination address from incoming message |
| Original Message ID | Message ID from incoming message |
| Number of Retries | 0 |
| Retry Count | 0 |
| Interval | 0 |
| Retransmission | "0" |

COMMENTS:

Considering now the handling of an incoming EMS Commit, when the EMS Router receives a commit from the next hop destination, it updates the status of the next message in the QEB for the message segment, and determines if the original message is now complete. If the message has an EMH destination node, which implies a network, then the EMS Router has to wait for acknowledgments as directed in the network-related EMH fields before marking the message as completed. If the message is complete, the EMS Router removes the related message from its queues or enqueues the original message and/or commit as directed by the exit routine area in the EMH. If, however, the message is not complete, the EMS Router leaves the message enqueued as it was, but with the new status, on the EMS Communication Agent queue (which is part of the Router queue). Finally, if a commit is received for a message which cannot be found by the EMS Router, it discards the commit. (The original message may have expired, or may have been deleted by an application). Upon the lapse of the time periods specific in the EMH (or ICB) interval field before a commit message is received from the next hop, then a retry sequence is initiated.

It is next appropriate to consider the actual integration of the invention EMS into applications and processes—such involving little more than inserting calls to the EMS API verbs at appropriate points in the programs. Before each call, of course, the fields required by the verb must be loaded by the application.

In some situations, there will be nothing more required in terms of interface design. EMS functionality will provide everything needed to handle the application requirements. More commonly, however, the application or process will need to have a number of interface routines added to handle tasks such as saving messages for future reference, notifying users that messages are waiting, handling addressbook maintenance, creating application/process acknowledgments, creating user acknowledgements, and the like. The principal aspects of setting up calls to the EMS API involve only loading the interface control block (ICB), FIG. 4, that accompanies each message content.

As will be recalled, message handling instructions from the sending application/user are placed by the application into the special EMS data buffer called the Interface Control Block (ICB). Applications must provide certain pieces of the ICB data before calling the EMS API to begin message transfer. EMS loads default data into the message ICB prior to allowing the application access to the ICB. The message ICB, indeed, exists only for the purpose of communicating between application and the EMS API. Data in the message ICB becomes the EMS Message Header once the message is accepted by EMS for transfer.

Application programmers are given access to the external view of the ICB, divided into two major portions: Data that governs end-to-end communication and most class-of-service processing; and data chat determines local processing for the communications hop in progress. Information is not duplicated from one portion to the other.

EMS, in accordance with the invention, manages both the end-to-end communications as well as each intermediate hop. The application never sees the details of the intermediate hop and it has no need ever to know this any more than one would care how a telephone call was physically routed.

When the application executes the GET BUFFER verb FIG. 3, EMS hands back an initialized external view of the ICB along with the message area and destination list area. Both the network and local processing portions are set to the default values, along with the addresses and lengths determined for the GET BUFFER call.

While the only network which currently utilizes the net-work fields in the ICB directly is the Motorola MoNet, the information in this area is sufficient to permit connection to many other processing networks with the addition of a new communication agent. Layout of the ICB is independent of the actual communications media and networks used in the message transfer.

The ICB is accessed as a structure by the application. In order to guarantee compatibility with future EMS releases, the application should always access the ICB fields by name within the structure. The ICB structure is provided to the application programmer as a 'c' header file. IMRTREXT.H. If the calling program is not written in 'c' than a similar structure needs to be defined in the development language. This header file includes both the structure and the definitions of the layouts of various internal fields. The application may use these internal field definitions elsewhere for other purposes so that the programmer should always address the subfields by name to preserve compatability with later releases. If the programmer saves the ICB or portions thereof to structured disk files (dependent on the platform), a file conversion may be necessary to access this data between EMS versions.

In the ICB layout, network fields are presented before the local processing fields. Field defaults are taken from the configuration files NETYICB and LOCALICB. In Tables 1–4, the fields that are presented and additional regained fields have the following descriptions.

Eye Catcher

The eye catcher field is filled in the EMS API verb GET BUFFER and is used to ensure that the processing computer recognizes the header area. It is two byte character field, and is set to "@*" in this version of EMS. The initial value comes from the NETICB configuration file.

Release

The release field is filled in by the EMS API verb GET BUFFER and is used to ensure that the processing computer is utilizing the correct view of the IGB for the EMS version which initiated the message. The initial value comes from the NETICB configuration file.

Message Length

The message length contains the length requested by the application in the call to EMS API verb GET BUFFER. It is an unsigned short integer, limiting message length to 32,767 in this example. Where is no default message length.

Message Type

The message type currently defines the administrative message type according to, for example, the before—mentioned Motorola MoNet Service standards. The default value is "MS" for a normal message and is taken from the NETICB configuration file. This is a two character field. The application should normally produce only: Message (MS), MN (parameter maintainence), Status request (ST) and Look-up (LU) types. Depending on the setup of the configuration files, the application should expect to receive only: Message (MS). Look-Up Response (LU), Maintainence Response (MN), and Status Response (SR) types.

EMS configuration files, as before discussed, may be set up to return acknowledgements to the application, in which case the Services Acknowledgement (DL), the Device Acknowledgement (DV), the Application Acknowledgement (AP), the User Acknowledgement (US), and the Negative Acknowledgement (NK) message types. This field is used in determining the ultimate class-of-service.

Text Type

The text type indicates whether the contents in the message area are to be considered as binary or text, for compression purposes. Other values may be added further to describe the types of objects which may be shipped via EMS. This field is set to binary always, at this time, and the default is always taken from the NETICB configuration file. This field is presented to the application to ensure that it moves data properly internally. Text type is a one-character field and is used in determining the ultimate class-of-services.

Delivery Mode

The delivery mode is used by the processing network to define retry policy for messages to be routed by the network. As illustrations, "send once and quit", means that the message will be sent to the delivering service once. The processing network then discards the original message. The confirmation is ignored. "Send until expired" means that the message will be retried on a periodic basis until the proper acknowledgement message is received in response or until the message reaches its expiration time. The acknowledgement level is defined in the confirmation mode field. The default for this field is set from the NETICB configuration file. This field is ignored, however, for messages in which the processing network generates a corresponding response and is used in determining class-of-service.

Delivery Expiration Time

The delivery expiration time is used by both the processing network and local EMS copy to determine when a message should no longer be kept in an incomplete state. It is expressed in minutes as an unsigned integer and the default is taken from the NETICB configuration file. Maximum value, for example, is 32767 minutes (approximately 22 days).

Confirmation Tode

The confirmation mode defines the level of acknowledgement which the application expects in response to the receipt of the outgoing message by the ultimate destination. This is a one-character field and the default is set from the NETICB configuration file. The administrator, furthermore, may want to set this to other than supplied value depending on the criticallity of the applications which will be using EMS to send messages from this platform. This filed is ignored for messages in which the processing network generates a corresponding response. This field is also used in determining class of service.

Encryption Mode

The encryption mode defines the type of encryption and compression processing to be applied to the message area.

The default value for this one-character field is also taken from the NETICB configuration file. This field is further uaed in determining class-of-service.

Destination List Type

The destination list type is a one-character field that identifies the types of identifiers provided in the destination list. The processing network uses this indicator further to determine class-of-service. The default value once more is taken from the NETICB configuration file. The value of destination list type is compared against the destination list actually provided (single entry or multiple) for consistency when the sending application executes the EMS API SEND verb.

Routing Preference

The routing preference is a one-character field which the processing network uses to determine how best to reach the final destination, with the default value taken from the NETICB field. The administrator of EMS on this platform may want to alter this default, depending on the criticallity of the application on the platform. It should be noted that a message to a single destination ID can be expanded by the processing network to multiple messages. This implies that multiple acknowledgements may be returned. This field is used in determining the ultimate class-of-service.

Message Priority

The message priority determines the order that this message will be handled by EMS and the processing network relative to other messages. The value of this one-character field varies form the number "0" to "9", with "0" being the highest priority. The application should send messages with values "1" through "9" only, since commits and some network responses use "0" to ensure the speediest processing possible. The default for this field is contained in NETICB configuration file. This field is used in determining class-of-service by both EMS and the processing network.

Recovery

The recovery indicator is used by EMS on certain platforms to indicate whether the message is to be put to permanent media while it is active. Certain platforms always put messages to disk while the message is active. Others keep active messages in memory only, unless directed by this field to put them to disk. If the recovery indicator is set to "N", then the message may be lost by an EMS copy if the platform fails while the message is in an active state. Possible values may be "N" for no and "Y" for yes. The default value once more is taken from the NETICB configuration file.

Destination Node

The destination node name identifies the name for the next hop. This field need not be used by the sending application if the destination list type is single and the destination ID is present in the addressbook. It is filled in by the routing logic in response to the EMS API SEND verb or if the default from the NETICB file is sufficient. It is provided for information purposes to the receiving application at the destination EMS installation, and reflects the last hop information.

Destination Service

The destination service identifies the communications medium (communication agent type) over which the message is to be sent (outgoing) or was received (incoming) for the current hop. This field need not be used by the sending application if the destination list type is single and the destination ID is present in the addressbook. It is filled in by the routing logic in response to the EMS API SEND verb or if the default from the NETICB file is sufficient. It is provided for information purposes to the receiving application at the destination EMS installation, and reflects the last hop information. Possible values for this two character field depend upon the communication agent set installed on the platform.

Destination Address

Destination address is the specific network address (i.e. telephone number, radio modem ID, IP address, x.25 address, etc.) by which the message is to be delivered to the next hop (outgoing) or by which the message was received (incoming). It is filled in by routing logic in response to the EMS API SEND verb of if the default from the NETICB file is sufficient. It is also provided for information purposes to the receiving application at the destination EMS installation, and reflects the last hop information. This is a 16-character field and presents the address in its expanded format.

Network Source User ID

If the EMS installation on a platform supports an interface to a processing network, then the network ID of the current user is placed in this eight-character field. It is provided to the application for reference only.

Submitting Network

For outgoing messages, this is the communication medium which will be used to send the message to the first hop. Possible values for this field depend upon both the communications media which are installed on this platform and chose which can somehow connect with a processing network. This field is filled in by routing logic in response to the EMS API SEND verb or is the default from the NETICB file, if sufficient.

Submitting Device

For outgoing messages, this is the communication network address (i.e. telephone number, radio modem ID, etc.) which will be used to send the message to the first hop. For incoming messages, this is the communication network address over which the message was sent to the first hop. Possible types and formats for this field depend upon both the communications media which are installed on this platform, and those which can somehow connect with a processing network. Contents of this field may be compressed if the address is numeric and can be longer than eight numeric characters. This field is filled in by routing logic in response to the EMS API SEND verb or is the default from the NETICB file, if sufficient.

Message Pointer

The message pointer is provided in response to the EMS API verb. It is a pointer to the message data area which is as long as the message length. The application must not change this value but needs to use it to fill in the message contents or to retrieve the message contents, as is appropriate. The format of the pointer is platform-dependent.

Address List Pointer

The address list pointer is provided in response to the EMS API verb. It is a pointer to the destination address list area, which is as long as the length of an address, say (8) times the number of ID's. The application must not change this value but needs to use it to fill in the destination network addresses or to retrieve them, as appropriate. On incoming messages to an application, there is only a single address. The format of the pointer is also platform-dependent.

Local User ID

The local user ID field contains the name of the current local user (as contained in the USER configuration file). It is provided for application reference only for sending and receiving, but may be used for further queue qualification on other types of EMS API verb executions. It also may be an 8-character field.

Message Identifier

The message identifier in an EMS-generated field is used uniquely to identify every EMS message. It is assigned by the EMS API verb GET BUFFER for each message. The platform name is taken from the EMS Registration configuration information.

Receipt Requested lode

The receipt requested mode indicates whether intermediate hops are to send EMS commits for this message. The default for outgoing messages is taken from the LOCALICB configuration file, this field being also part of the class-of-service determination.

EMS Mode

The EMS mode indicates an overall transport priority based upon the object type; for example, express for normal messaging, and bulk for larger object transmissions. This field is included for future expansion purposes, with the default value being taken from the LOCAL ICB configuration information.

Resubmit Indicator

The resubmit indicator is used by EMS to determine if retries on hop transmissions are to be executed. The default is taken from the LOCAL—ICB configuration information. On incoming messages, this indicator is "0" if this is the original transmission, and "1" if it is a retried transmission.

Request Code

The request code defines an inquiry request to EMS for other than sending and receiving messages.

Number of Desired Retries

This field indicates the number of desired retries between hops. The default is taken from the LOCALICB configuration information. The sending application may change this value, which is a short integer.

Return Code

The EMS status and purge type verbs return parameters and status codes. Depending on the verb, the values are placed in return code field.

Retry Period

The retry period is the number of seconds which the EMS Router will wait to receive a commit from the next hop for an outgoing message before reinitiating the transmission via the communication manager. There is a minimum time winch is allowed based on the communication medium involved (service configuration information). The default is filled in from the LOCALICB configuration file for a GETBUFFER verb.

Message Completion Process

The name of the process to handle all the messages which are completed is entered in this field. The default is taken from the LOCALICB configuration file. If the process name is not provided, completed messages are not enqueued for any other application. The process is translated into a queue name from the APPLICATION configuration information. If there is no entry in this file for the specified application, the message is enqueued to the specified name.

Message Time Out Process

Message time out process is the name of the process to be called to handle all messages that do not receive either a commit within the retry period or that reach a completed state before the expiration period. The default is taken from the LOCALICB configuration file. If the process name is not provided, completed messages are not enqueued for any other application. The process is translated into a queue name from the application configuration information. If there is no entry in the configuration file for the specified application, the message is enquequed to the specified name.

Message Time Out Request ID Process

Message time out request ID process is the name of the process to handle all messages that do not receive either a commit within the retry period or that reach a completed state before the expiration period. The default is taken from the LOCALICB configuration file. If the process name is not provided, completed messages are not enqueued for any other application. The process is translated into a queue name from the application configuration information. If there is no entry in the configuration file for the specified application, again, the message is enqueued to the specified name.

Time Sent or Received

For incoming messages, the time received is filled in by EMS. For outgoing messages, the time sent is filled in by EMS. This is a reference field for the application. Format of the time is the same on all platforms.

Scheduled Time

If an application desires to defer a message until a specified time, then the date and time for the initial attempt are entered in this area. If no values are entered here, the message will be sent as soon as the selected communication medium becomes available and all higher priority messages for that medium which are ready (not delayed for retry) have been sent.

Details of EMS API Verb Operation

While the identification of EMS API verbs and their usage has been discussed, further details as to their format, function and uses for various applications and platform differences is now in order.

Turning, first, to the COMMIT API verb, it, as before explained, FIGS. 3, is used to inform a sending EMS Router that a complete message has been successfully received and processed as required and that the message resources (i.e. delete the message and related queue data), both local and remote, may now be released. Message status is also updated. User and application requests for return receipt/ guaranteed delivery are made by setting the confirmation mode field in the net-work ICB. When the message is received by the EMS Router on the receiving computer, it uses the COMMIT verb to return a receipt acknowledgement to the sender (user or application). Alternatively, a receiving user or application can call COMMIT to send an acknowledgement message to a sending user or application following message receipt and processing. By this means, EMS can provide end-to-end message delivery acknowledgements. COMMIT is also used between EMS Routers to provide hop (internal) delivery acknowledgements.

Figure 8:
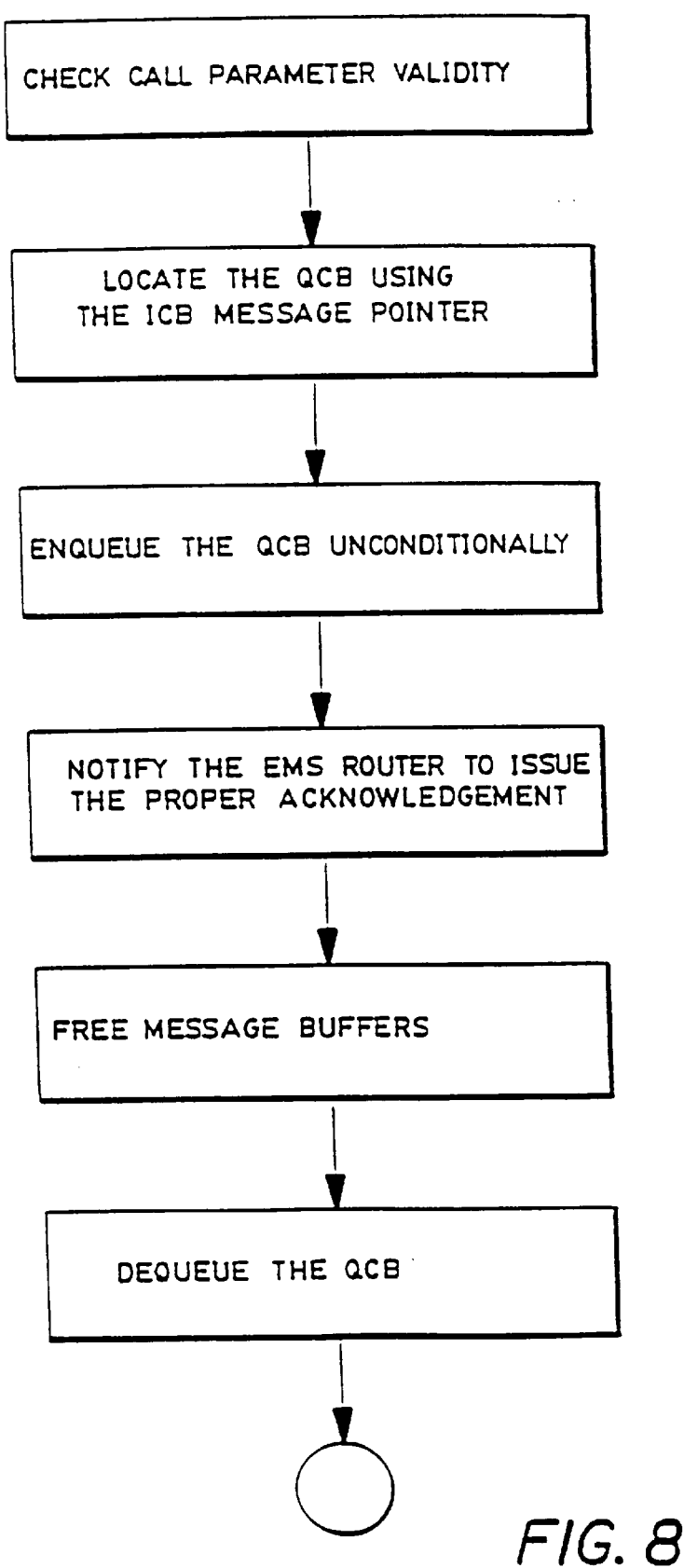

Thus, in the flow chart of FIG. 8, after checking the call parameter validity and using the ICB message pointer to locate the QCB (queue continue block), such is enqueued and the EMS Router is notified to issue the proper acknowledgement. The message buffers are then freed and the QCB de-queued.

Figure 9:
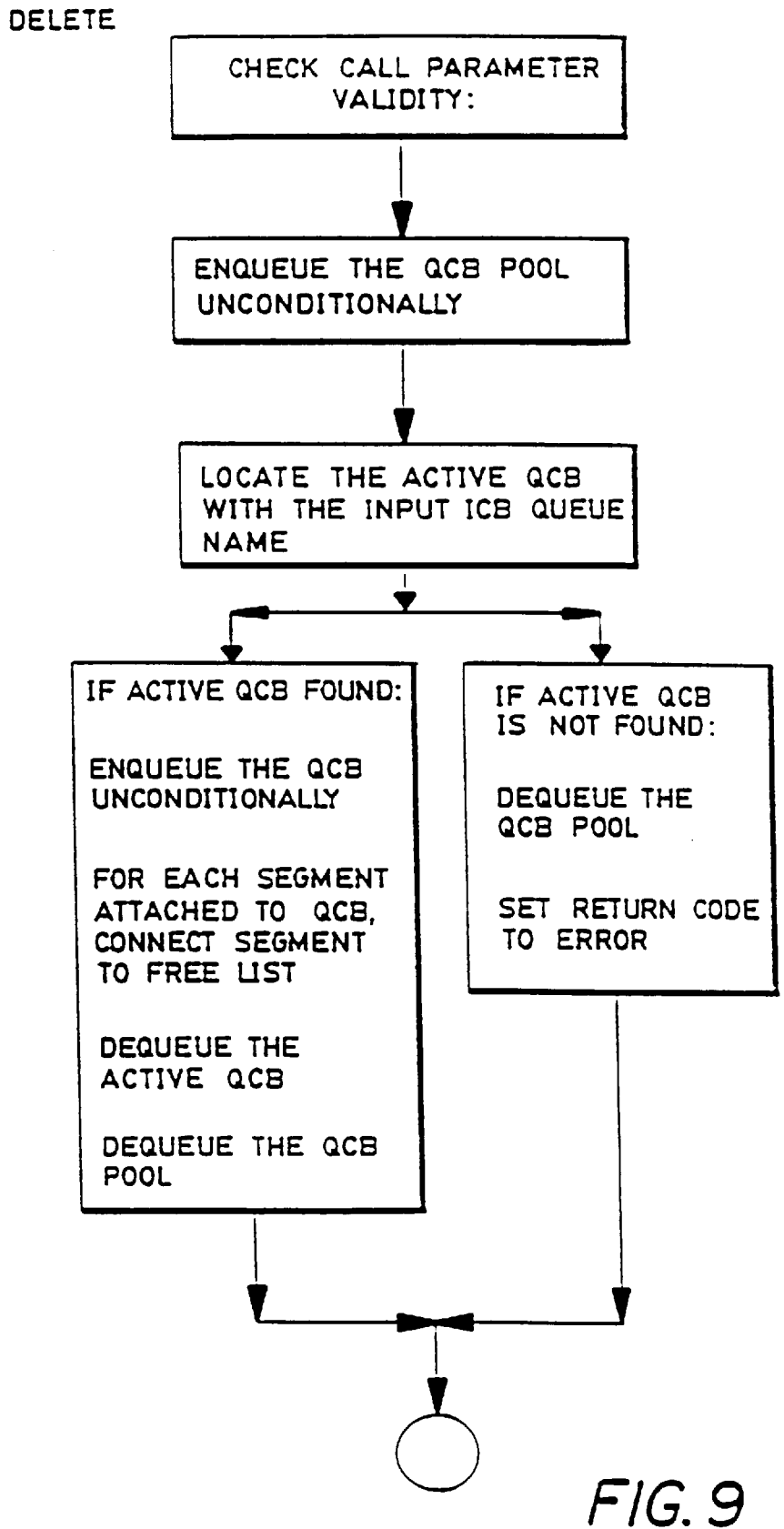

Considering now the DELETE verb, FIG. 9, such, it will be recalled, allows the removal of one or more selected messages from a specified queue (destination) regardless of priority, pending or active state or whether receipt has yet been acknowledged. A user or application may occasionally discover messages still in a queue awaiting destination availability that are no longer valid, that have a destination no longer in existence (user, application or system), or that have a destination known to be experiencing extended unavailability. The DELETE verb allows such messages to be removed by the user or application.

Following call parameter validity check and QCB pool enqueuing, the active QCB with the input ICB queue name is located, FIG. 9. If an active QCB is found, following enqueuing, each segment attached to the QCB is connected to a free list and the active QCB and the QCB pool are dequeued. If, on the other hand, an active QCB is not found, the QCB pool is thereupon dequeued, and the return code is to error.

To accommodate for platform differences, since DELETE might cause unpredictable results if operating on a queue being accessed by another process in a multi-processing environment, it will reserve the queue to allow itself exclusive use of the queue while it is deleting records. Any other process sending or receiving from the queue at the same time is suspended temporarily. This is a special internal transient state that exists only for the duration of the DELETE operation. The external state of the queue will remain as it existed prior to the commencement of the DELETE operation.

The FREEBUF verb, before discussed, is called by an application to free resources:

(a) allocated by GETBUF for STATUS calls, (b) allocated by GETBUF for STATE calls, (c) passed to the user via the RECEIVE call for incoming message delivery where a COMMIT is not issued, and/or (d) allocated by GETBUF for outgoing messages not passed on to the Router (i.e., cancelled).

Whenever an application receives a message or checks message status or queue state, EMS creates data storage areas and queue entries. These resources must be released using the FREEBUF verb FIG. 3, after they are no longer required—after a message has been received and processed by the application and after each STATUS and STATE call. Application programs use the FREEBUF verb to release the resources associated with the API buffers allocated by GETBUF and message receipt. FREEBUF releases the local and network ICB and message data areas for messages, as well as the Queue Entry Block. FREEBUF also validates the input message buffer to ensure that the resources are not associated with a message in progress (on the outbound queues), returns the buffer to the free buffer pool, and releases any other resources associated with the message.

Figure 10:
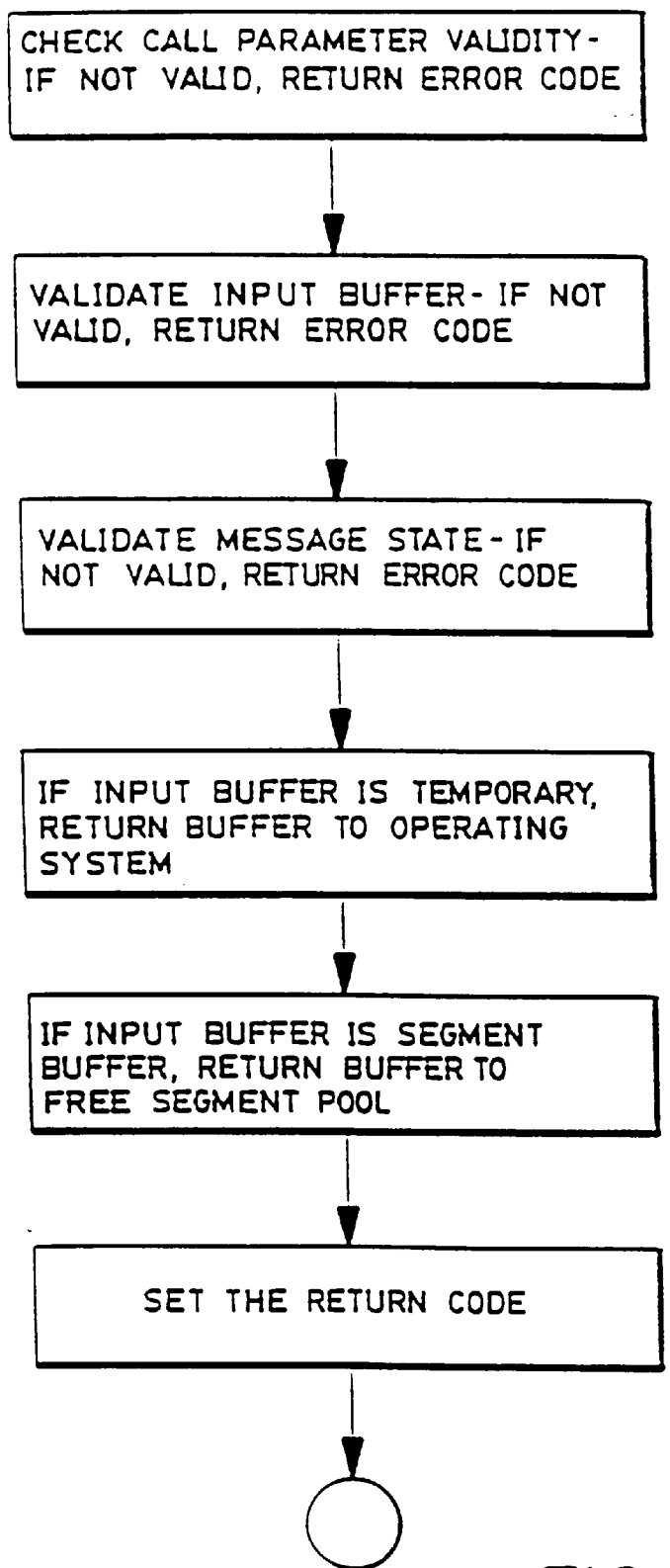

Referring to FIG. 10, following call parameter, input buffer and message state validation, if the input buffer is temporary, it is returned to the operating system; but if a segment buffer condition exists, the buffer is returned to free segment node and the return code is set.

Figure 11:
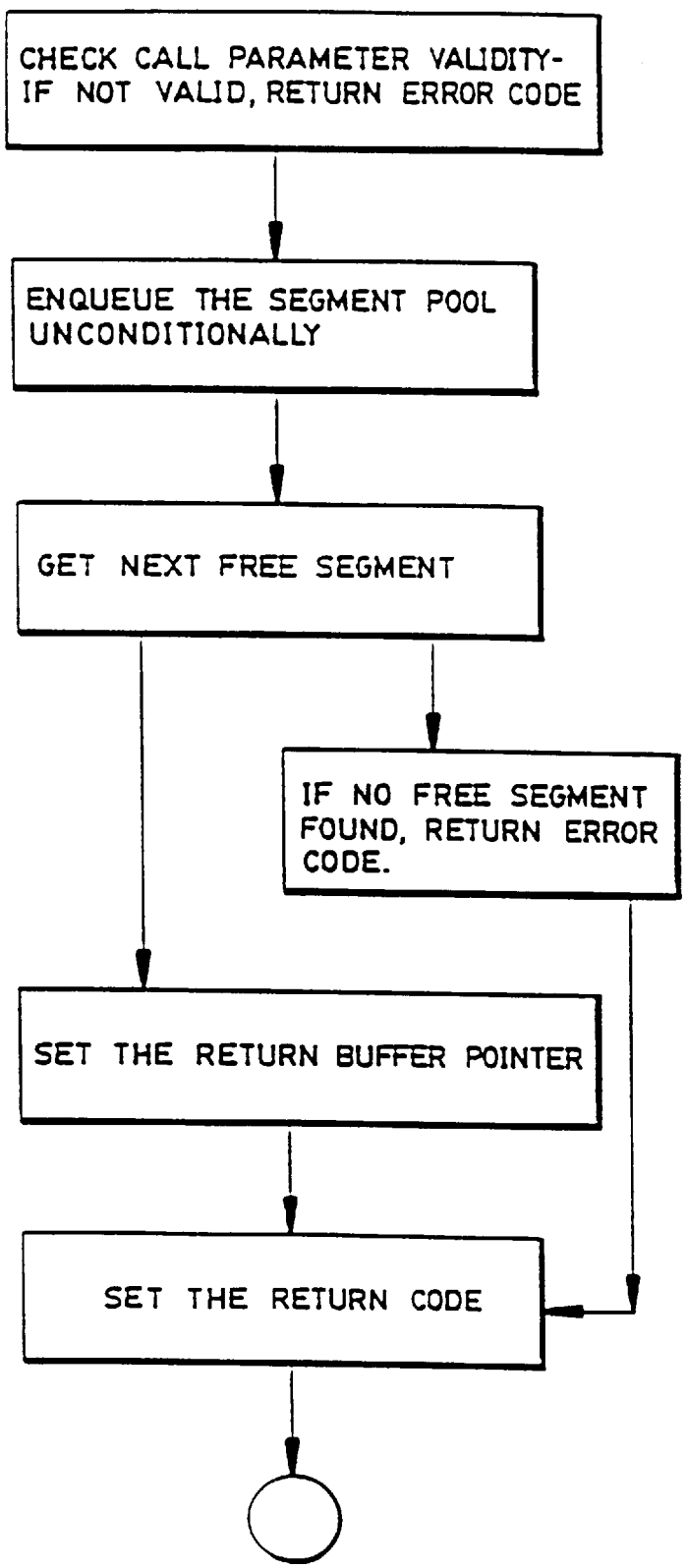

In FIG. 11, the flow of the GETBUF verb operation is outlined, this verb, as previously described, allocating internal EMS memory and/or other resources needed to support the SEND, STATE, and STATUS services of EMS.

Application programs must use the GETBUF subroutine, FIG. 3, to allocate all EMS API buffers needed to SEND messages, to retrieve queue STATE and to obtain STATUS for an individual messages. GETBUF returns an empty message buffer that carries ICBs loaded with default values. By securing message resources with GETBUF prior to issuing a SEND call, an application can be assured of having the necessary resources available for message delivery. This feature is especially important for very long messages that may at certain times exceed available resources.

GETBUF interrogates the message buffer pool for available resources. If the requested size is greater than the maximum size, GETBUF returns an error. If the requested size is less than or equal to the maximum size, GETBUF locates a free buffer in the message segment pool and returns it to the calling program. If GETBUF cannot locate a temporary buffer or segment, it returns error to the calling program. GETBUF accepts a message length of 0 for use prior to STATUS and STATE, calls.

As summarized in FIG. 11, following call parameter validity check and enqueueing the segment pool, the next free segment is located and the return buffer pointer and return code set. If, however, no free segment is found, a return error code is set.

The INITIALIZE verb, as before explained, connects the calling application process to the EMS infrastructure by creating and initializing one or more EMS Router queues (normally, a send queue and a receive queue) for the calling process. The INITIALIZE, FIG. 3, establishes the connection between an application and the EMS infrastructure. It must be called before any other EMS API calls are made—usually, at the time the application itself is initialized. INITIALIZE creates and initializes one or more queues managed by the EMS Router and notifies the EMS Communications Manager CM to initialize appropriate EMS Communication Agents, FIGS. 2 and 4, so that the message traffic to and from the application may begin.

INITIALIZE first looks for an existing queue for the application process—one which may have been established during system initialization and configuration. If the queue already exists, INITIALIZE locates the existing queue control block (QCB) and, after verifying that no other active application process has issued an INITIALIZE for that queue (depending on environment), connects the queue with the calling process (mechanism dependent on environment). If an existing queue is not found, on the other hand, INITIALIZE creates one and then goes through the same connection process.

INITIALIZE further opens the appropriate files (mailboxes) for the designated queues based on the EMS Configuration Files and the operating environment. If the queue file for the designated queue already exists, then it is read from the media and QEB's are built for the messages contained in the file. If no queue file exists for the requested queue, one is established and a QCB is set up with null pointers in the QEB entries.

Depending on the environment, moreover, a "wake-up" is issued for the EMS Communication Manager CM, FIGS. 2 and 4. If the CM is already running, this call has no effect; otherwise, the CM is started. INITIALIZE does not, however, wait for the CM to start before continuing.

It is not necessary, furthermore, for any application to issue INITIALIZE if all of the queues for a platform in any environment are defined in the configuration files as static queues. Existing queues may be memory-based, disk-file based using environment conventions, or resident in a database, or a combination of all of these. The exact implementation of the queues does not affect the basic functionality of the EMS processes or the API verbs. Whenever the environment supports it, messages will be written to auxiliary media (disk) if they are designated as recoverable. The queue name length is specified in imrtrext.h. It must not be changed for DOS or WINDOWS implementation as it is used to build a queue file name.

Figure 12:
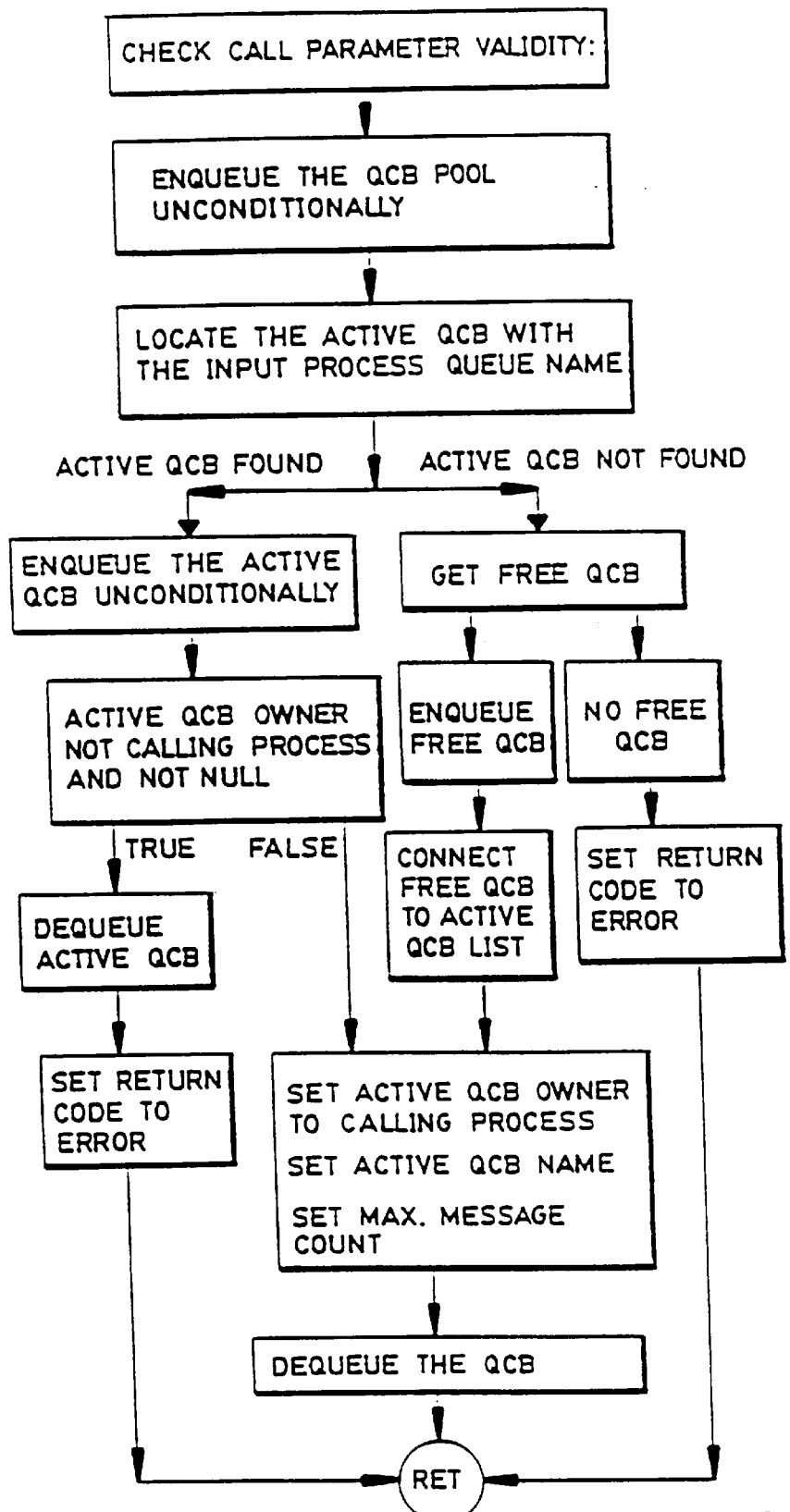

After call parameter check, FIG. 12, and enqueueing the QCB pool, the active QCB with the appropriate input process queue name is located and enqueued. If it is true that the active QCB owner is not calling; the process (and there is not a null), the active QCB is dequeued and the return code is set to error; but if such is not true (false), the active QCB owner is set to calling process, an active QCB name and a maximum message count, and then the QCB is dequeued and return is effected. This latter sequence is also ordered if the active QCB is not found and a free QCB is enqueued and connected to the active QCB list. Should no free QCB be found, however, the return code is set for error.

Turning now to the previously described PURGE verb, such allows an application to remove all messages from any local queue regardless of priority and regardless of pending or active state.

An application may find it necessary or desirable in rare instances to remove all of the messages from one of its EMS Queues. This might occur if the computer runs low on resources and needs to free up memory, if the user learns that a particular destination (queue) is no longer available, or if the user wishes to clear all messages from a particular sender (i.e, without receiving them). A PURGE call for the queue name will delete all messages for that destination or sender.

Figure 13:
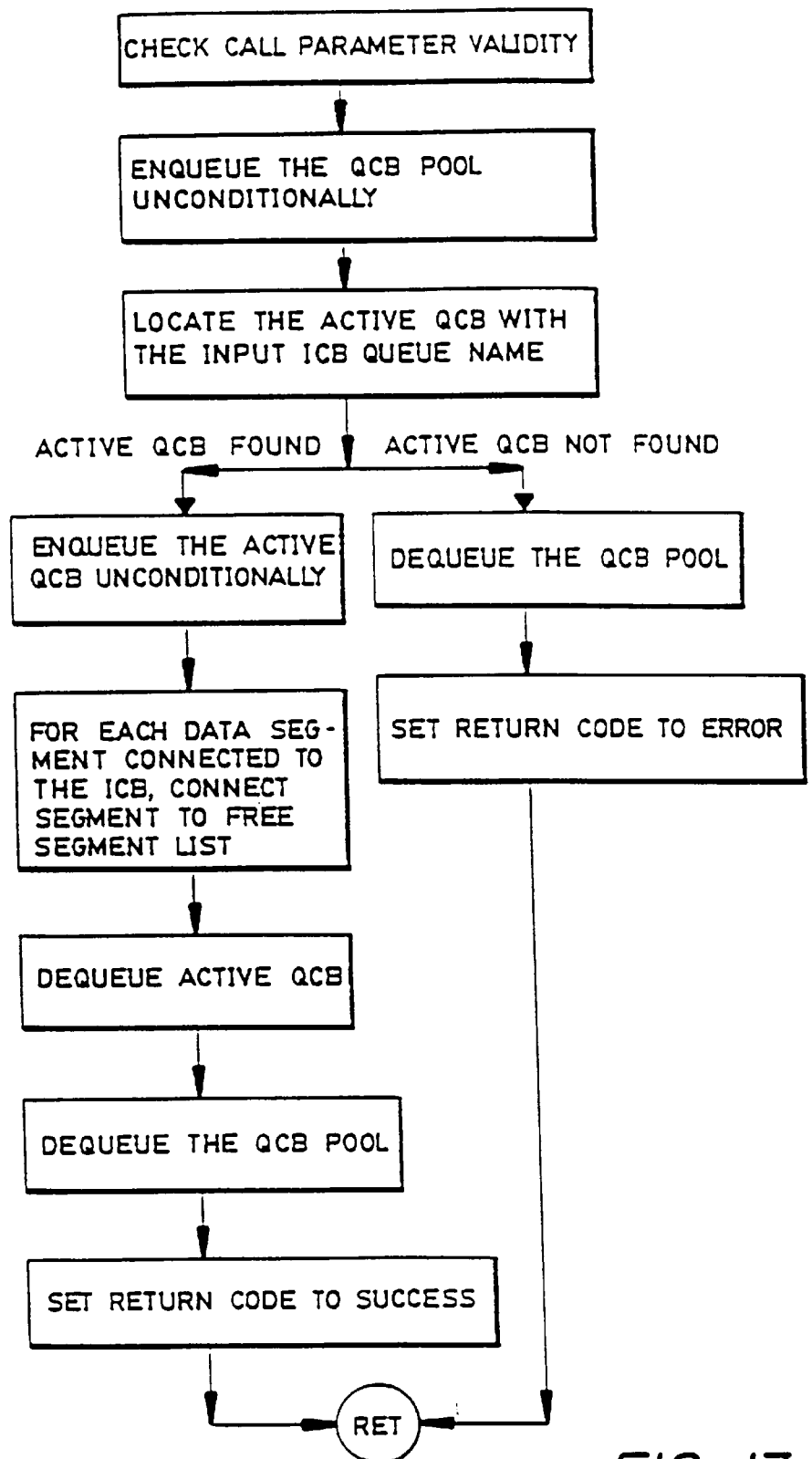

As shown in FIG. 13, after validating the input parameters, PURGE enqueues the QCB pool and locates the QCB with the input ICB queue name. If the QCB is found, PURGE frees all message segments for all priorities chained to the QCB, and then frees the QCB itself, setting the return code to SUCCESS. If the input QCB is not found, however, PURGE returns an error code to the caller.

The RECEIVE verb is used to effect delivery of an incoming message to the destination application or user and to query the EMS Router about traffic awaiting delivery to this destination. The first message of the highest priority awaiting delivery is returned in the ICB and the return code in the local ICB is set to the number of remaining messages that are to be retrieved, FIGS. 4 and 6. Since every application is different, it is necessary for the individual application to be able to control when and how it receives incoming messages addressed either to itself or to the current user. The RECEIVE verb, provided for this purpose, allows applications to call for messages only when the application (user) is ready to process the message.

Figure 14:
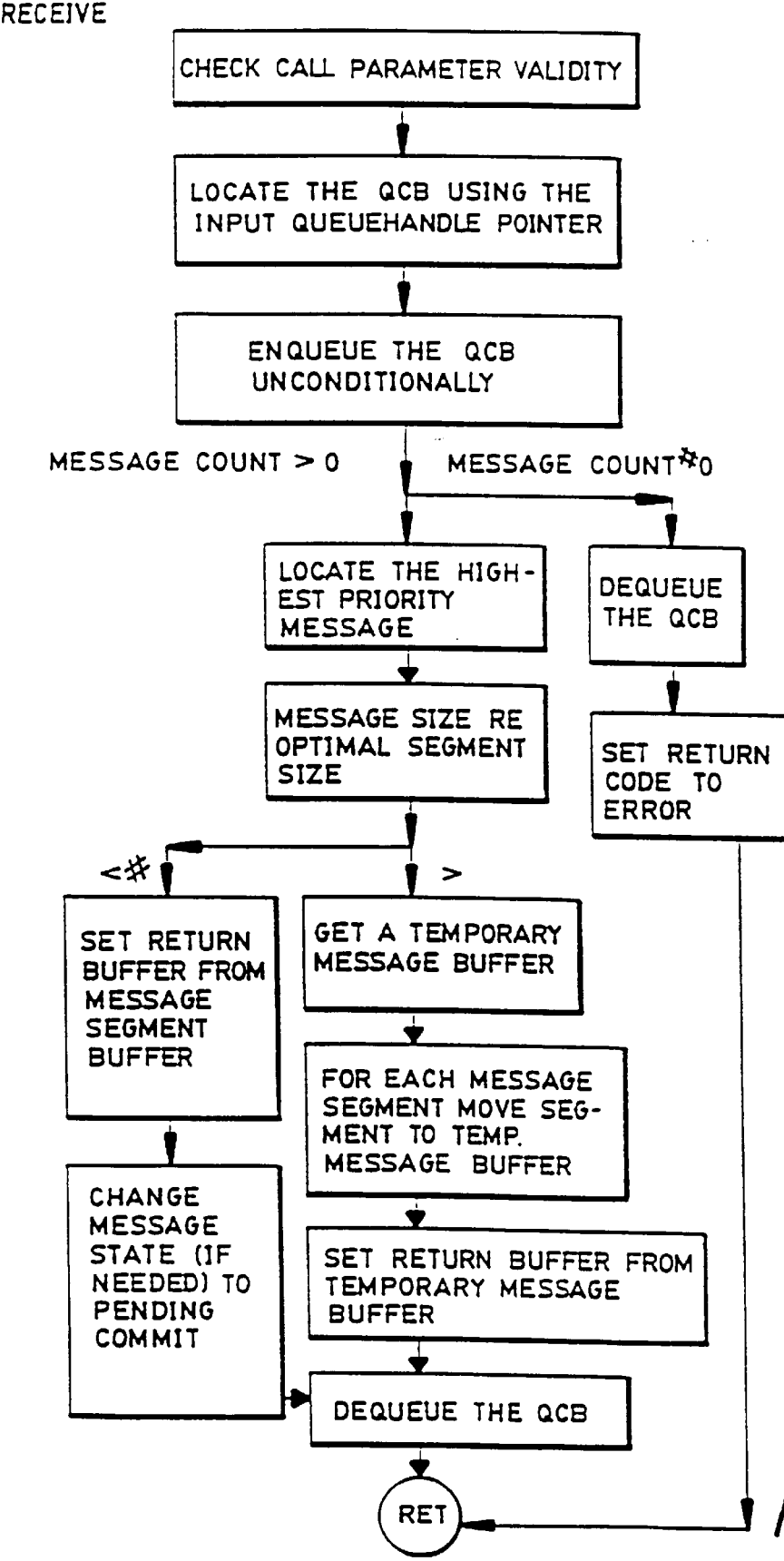

RECEIVE validates the input parameters, FIG. 14, and allocates the buffer space necessary for the ICB areas and the message segment. Depending on the configuration parameters, RECEIVE then moves the data from each segment into the receive buffer to build the complete message, or returns the message segments to this application, one at a time, as independent datagrams. Thus, after locating the highest priority message and optional segment size, either each message segment is moved to temporary message buffer and then sets the return buffer, or the return buffer is set from the message segment buffer enabling a change in message state, if needed, to PENDING COMMIT. In the event there is no message count (0), the QCB is thereupon dequeued and the return order code set to error.

RECEIVE returns the pointer to the local ICB, which, in turn, contains the pointer to the network ICB and message data areas. The application has addressability to each area. The return code field of the local ICB contains the number of messages enqueued for the application (not counting this one).

The SEND verb permits an application to place a message into the EMS Router Oueue for eventual transmission to the specified destination. The application may then go on to do other work. It does not have to wait for the message transmission to complete. Messages created by application are handed to EMS using the API's SEND verb. SEND thereupon causes a message to be placed on the EMS Router Queue for the specified destination where it will await processing based on instructions in the local and network ICBs and the EMS Configuration Files. SEND places an application message on the "send queue" assigned to that application and user, and performs only the basic formatting error checks such as field presence or absence, and pointer range. All other local and network ICB checks and audits are performed by the EMS Router using the configuration values.

Even in an environment such as MS-DOS, the message processing after the SEND function is completed proceeds in background to the user applications. It should be noted, moreover, that the EMS Communication Manager CM, FIGS. 2–4, also uses the SEND verb to pass incoming messages to the EMS Router for further direction (to a local application/user or to the next node in the network).

Figure 15:
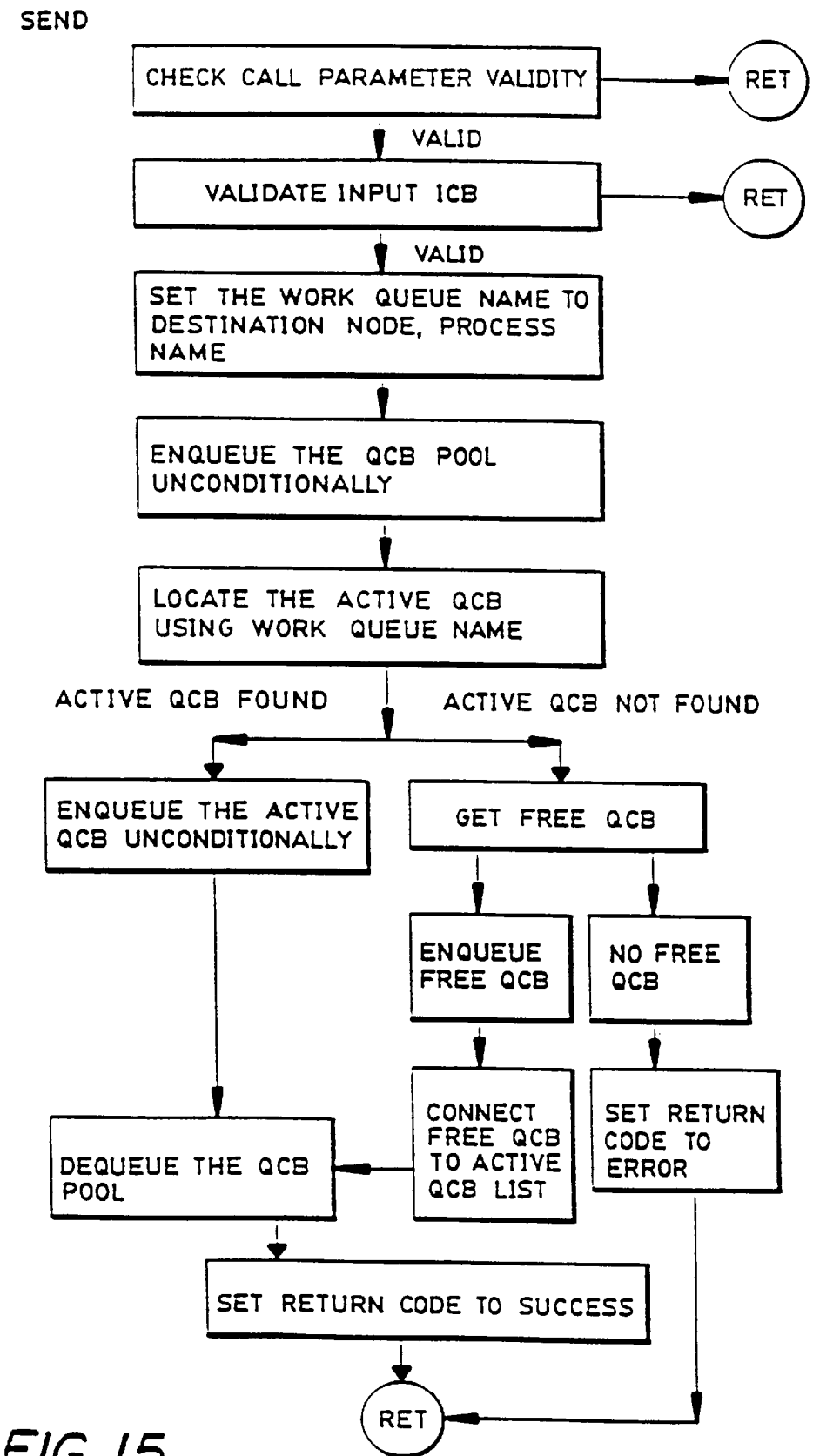

In FIG. 15, accordingly, after call parameter and input ICB validation, the work queue name is set to destination node and process name and the QCB pool is enqueued. If an active QCB using the work queue is located, unconditional enqueueing of the active QCB is effected and the pool dequeued, with the return code set to SUCCESS. If such an active QCB is not found, a free QCB is enqueued and connected to the active QCB list before the pool is dequeued and SUCCESS indicated. Should there be no free QCB, however, the return code is set to error.

The before-described STATE verb allows an application process to inquire about or to alter the state of any local EMS Router queue. Application programs can use the STATE verb to alter the state of an EMS queue or to inquire about the state of a queue. During certain times, an application program (or the user) may, for example, wish to allow only the queueing of incoming messages, but to disable sending of message until the state is changed.

The local ICB carries queue status as part of its normal data. When an application program calls STATE to alter the queue state, it must first place the desired state in the local ICB (obtained using a GETBUF call). A STATE call returns with the altered state of the queue, if successful. When an application program calls STATE to inquire on the state of a queue, STATE updates the ICB with the actual state of the queue which can then be read by the application. The EMS Router queue state processor (STATE function) allow two operations to be performed on single queue—either inquiry or update of queue state. The local ICB for the verb update includes the reason code and the state change.

The STATUS verb allows an application to inquire about or alter the status of any message in the named send queue and to obtain the number of messages in the queue. In general, application programs will not need to use the STATUS verb. STATUS should be used by application programs only in environments where message acknowledgements are not returned to application programs and there is no generally available way supported by the environment to notify the program when an event has occurred. For example, in some environments it is necessary for the sending application to "poll" the EMS Router to see if an out-going message has been completed (older MS-DOS). When needed, however, STATUS allows the queue state of any message entry in the queue to be read or modified. STATUS first validates the local ICB. If the call indicates a status inquiry, STATUS returns message status in the local ICE passed by the calling program. If the call indicates a status change, STATUS verifies that the current status is accurately set in the request ICB by the calling program. If the current status is properly depicted by the calling program in the ICB, STATUS attempts to make the status change indicated. If the status change requested is logically incorrect, STATUS reports an error to the calling program.

Figure 16:
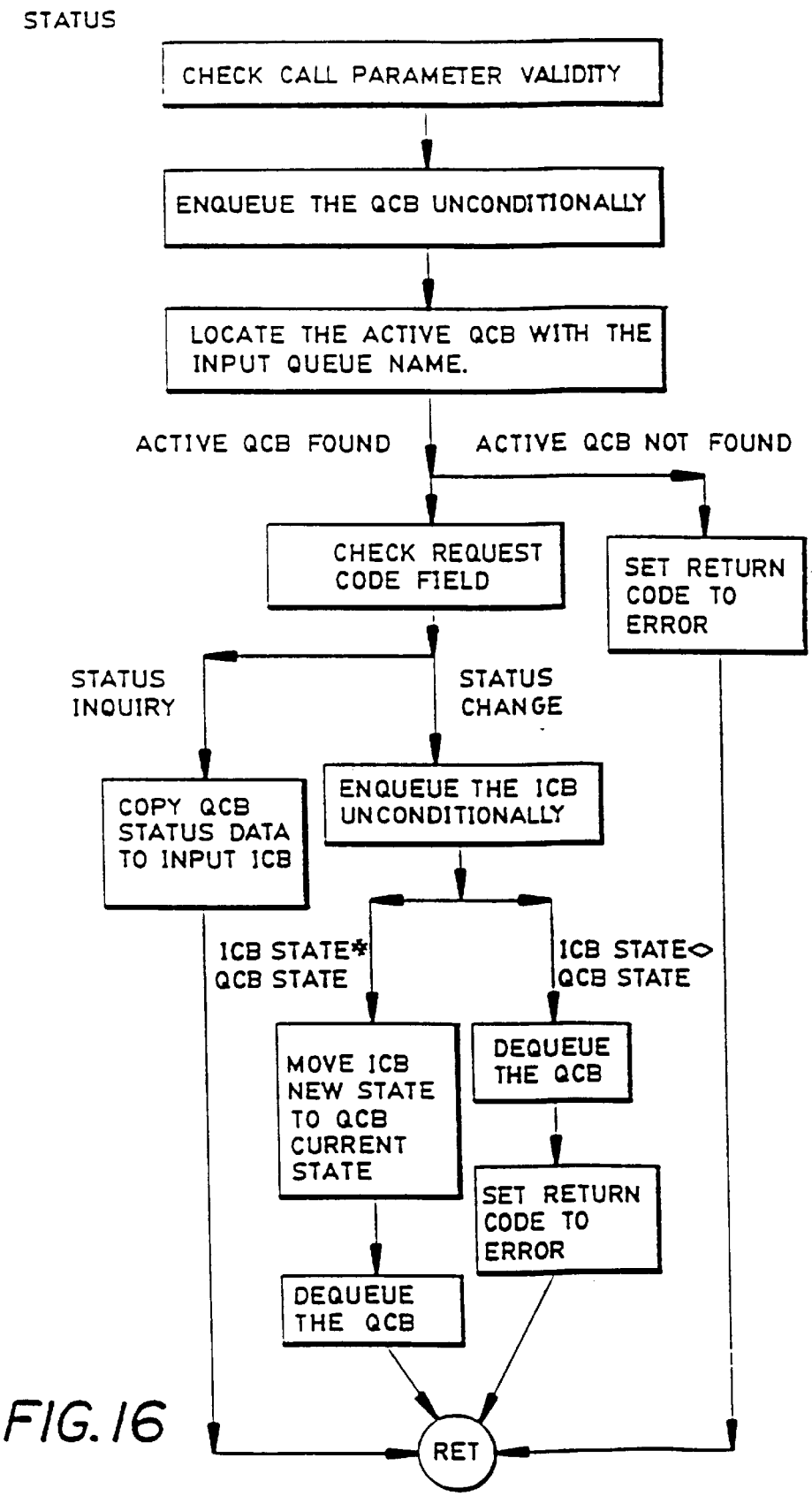

In FIG. 16, therefore, following location of an active QCB with the input queue name and a code field request check, a status inquiry may be effected by copying the QCB status data in the ICB input. For a status change, on the other hand, the ICB is enqueued and either the ICB new state is moved to the current state and then the QCB is dequeued, or the QCB dequeueing is directly effected and the return code set to error.

Before application exit, TERMINATE is called to clean up, resolve latent messages, and terminate the application EMS Router queue connection. The TERMINATE verb disconnects an application process from the EMS queueing infrastructure. TERMINATE deactivates the EMS Router queue (previously created by INITIALIZE) and causes LogOff messages to be sent to attached networks if the queue is "send" or "receive" (this is done at application termination processing time only). TERMINATE releases the resources associated with the input and output queue connections for the calling process. This verb must be called before exiting the application in order to insure queue integrity and orderly communications close-out. TERMINATE, furthermore, logically disassociates the calling process from the EMS Router queue described by the input queue handle. It first checks for messages on the calling process Router queue. If there are no messages, TERMINATE frees the queue control block. If there are messages, they are either saved as directed in the configuration files, or discarded.

Figure 17:
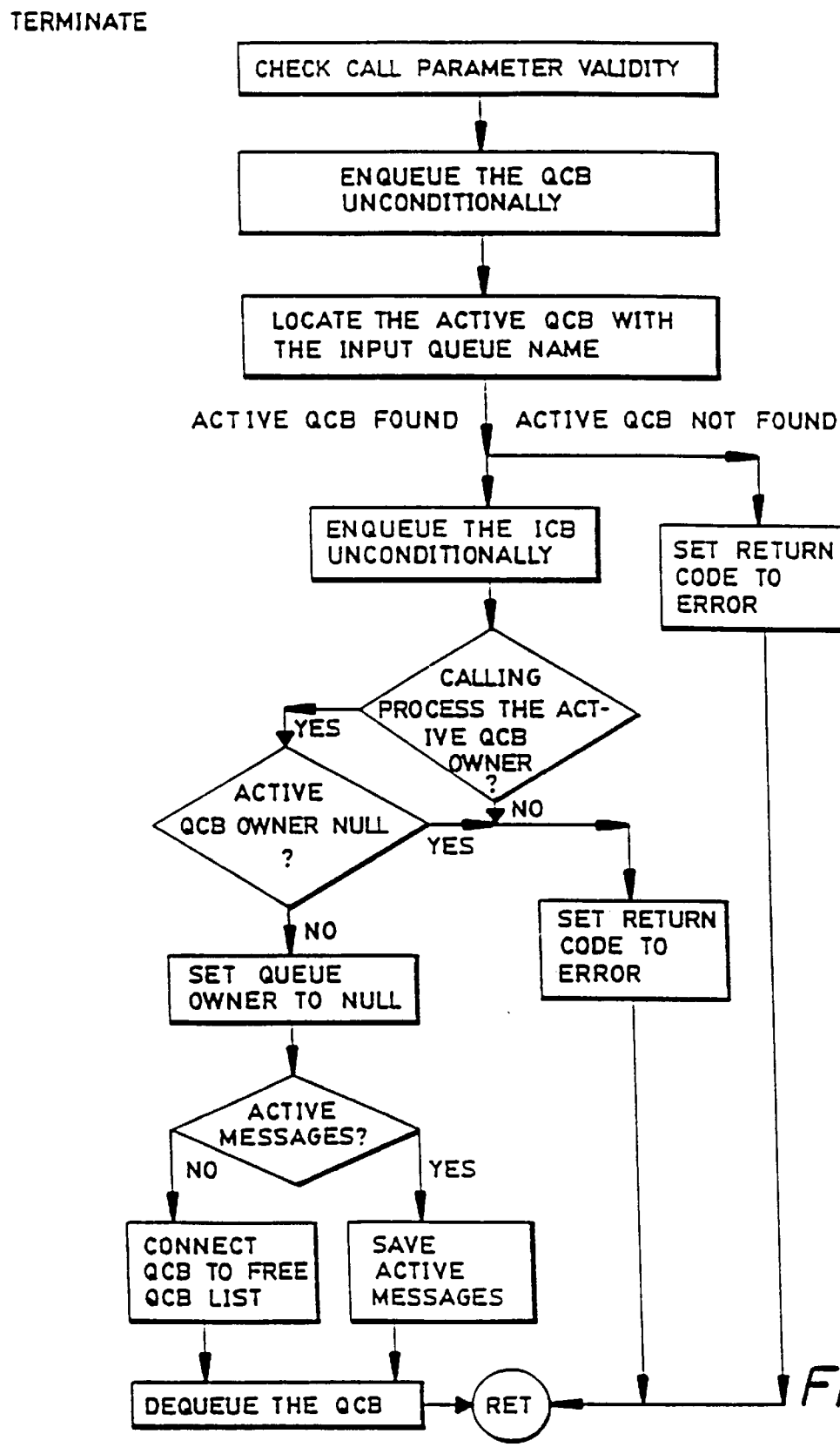

Referring to FIG. 17, accordingly, upon locating an active QCB with the appropriate input queue name and enqueueing the ICB, if the calling process is the active QCB owner ("yes") and is not a null, after setting the queue owner to null, active messages are either saved before dequeueing the QCB, or if there are no active messages, the QCB is connected to free QCB list before dequeueing. Otherwise, the return code is set to error.

The invention, thus, in addressing business needs of supporting enterprise integration and worker/task/workplace mobility, and integrating incomparable networks with multi-media, multi-network and multi-platform needs, provides a consistent and cost-effective solution through its providing of vendor and platform independence, guaranteed data/message delivery, and transparent interchange of multimedia data, with fully recoverable store-and-forward transfers and the broadest connectivity availability.

EMS equipment designed in accordance with the invention, as currently constructed, supports the operating environments, for the designated communications services and media shown in FIG. 18, with additions to this environment list to include UNIX System V Release 4 and Macintosh System 6.04 and others. Palmtop units running MS-DOS 3.3+ are also supported. Cellular modem support may be provided, also, for all environments that currently support dial-up asynchronous communications, and connectivity extensions to platforms including the Microsoft NT, DEC ULTRIX, HP-UX and Sun-OS are useable with the invention, also; demonstrating the wide scope of the universal, generic or heterogeneous approach of the invention.

Further modifications will also occur to those skilled in this art, and such are considered to fall within the spirit and scope of the invention as defined in the appended claims.

What is claimed is:

1. A method for controlling an electronic messaging protocol between a plurality of computer systems, each computer system executing an application program or a process, the method comprising the steps of:

providing a substantially identical electronic messaging system (EMS), including a plurality of verb-based software modules, in each of the plurality of computer systems; and directly accessing and controlling, through the EMS, the electronic messaging protocol by the respective application program or process in each of the plurality of computer systems, using the plurality of verb-based modules of the EMS, for transmitting a message from a transmitting application/process to a receiving application/process, including the steps of:

forming and releasing queues in response to a set of queue-controlling verb-based modules for storing and processing the message, with the queues being associated with a transmitting application/process and a receiving application/process involved in the electronic messaging protocol;

transmitting and receiving the message by the electronic messaging protocol using a set of transmission/reception verb-based modules; and generating acknowledgment signals to acknowledge, to the transmitting application/process, the receipt of the message by the receiving application/process.

2. The method of claim 1, wherein the step of providing the EMS includes the steps of:

staging the message using a router for transmission or reception by the transmitting application/process or by the receiving application/process, respectively; and providing an application programming interface (API) between the router and the corresponding application/process associated with the EMS, wherein the API includes the plurality of verb-based modules.

3. The method of claim 2, wherein the step of staging includes the step of:

managing the queues and messages therein using a queue manager of the router.

4. The method of claim 1, further comprising the steps of:

storing into saved files, during a shutdown procedure of the EMS, any non-transmitted saveable messages in the queues; and rebuilding queues of saved non-transmitted messages from the saved files during a start-up procedure of the EMS.

5. The method of claim 1, wherein the step of controlling the electronic messaging protocol using the EMS further comprises the step of:

formatting the message by:
generating an associated message header; and
encapsulating the message for transmission and reception by adding the message header to the message.

6. The method of claim 5, wherein the step of formatting further includes the steps of:

determining whether the message has a data length greater than a nominal limit; and subdividing each message having a length exceeding the nominal limit into message segments; and wherein each message segment has an associated message header generated and added thereto for transmission.

7. The method of claim 1 wherein the plurality of verb-based software modules includes at least the following modules:

COMMIT, to inform a router of the EMS that the message has been successfully received and processed by the receiving application/process, and that the queue associated with the transmitting application/process may be released;

DELETE, to remove a selected message from a specified queue regardless of priority, pending or active state, or whether receipt has yet been acknowledged;

FREEBUF, to release data/storage and queue entries when no longer required;

GET BUF, to allocate resources such as internal memory needed to support message sending and status services;

INITIALIZE, to connect the calling application/process for performing the electronic messaging protocol;

PURGE, to remove all of the messages from any local queue regardless of priority and pending an active state;

RECEIVE, to deliver an incoming message to the receiving application/process and to queue the message traffic awaiting delivery and priority to the receiving application/process;

SEND, to place a message into a routing queue for eventual transmission from the transmitting application/process to the receiving application/process;

STATE, to inquire about or to alter the state of any local routing message queues;

STATUS, to inquire about or alter the status of any message in a specified message sending queue and to obtain the number of messages in such queue; and TERMINATE, to resolve latent messages before termination of the corresponding application/process and then to terminate the application connection to a routing message queue.

8. A method for sending and receiving a message between a plurality of computer systems, each computer system executing an application program or a process, the method comprising the steps of:

providing a substantially identical electronic messaging system (EMS), including a plurality of verb-based software modules, in each of the plurality of computer systems; and directly accessing and controlling, through the EMS, the electronic messaging protocol by the respective application program or process in each of the plurality of computer systems, using the plurality of verb-based modules of the EMS, for transmitting a message from a transmitting application/process to a receiving application/process, including the steps of:

creating an outgoing message queue associated with the transmitting application/process for storing the message prior to transmission;

formatting the message for transmission;

transmitting the formatted message to the receiving application/process;

creating an incoming message queue associated with the receiving application/process for storing the received formatted message;

acknowledging the receipt of the formatted message; and releasing the memory associated with the outgoing message queue in response to the acknowledgment of receipt of the formatted message.

9. The method of claim 8 wherein the steps of creating the outgoing message queue and the incoming message queue are performed by an INIT module of the plurality of verb-based modules.

10. The method of claim 8 wherein the step of formatting the message for transmission is performed by a SEND module of the plurality of verb-based modules.

11. The method of claim 8 wherein the step of acknowledging the receipt of the formatted message is performed by a COMMIT module of the plurality of verb-based modules.

12. The method of claim 8 wherein the step of releasing the memory associated with the outgoing message queue is performed by a FREEBUF module of the plurality of verb-based modules.

13. A communication system for controlling an electronic messaging protocol between a plurality of computer systems, each computer system executing an application program or a process, the communication system comprising:

a plurality of substantially identical electronic messaging systems (EMSs), each EMS operating in a respective one of the plurality of computer systems to be directly accessed and controlled by the respective application program or process in the respective one of the plurality of computer systems for transmitting messages from a transmitting application/process to a receiving application/process, wherein each EMS includes:

an application programming interface (API) having a plurality of verb-based software modules which are called by the transmitting application/process and the receiving application/process to perform transmission and reception functions, respectively; and a router for managing incoming and outgoing queues of the messages.

14. The communication system of claim 13, wherein the incoming and outgoing queues are created and released in response to queue-controlling verb-based modules.

15. The communication system of claim 13, wherein the router formats the messages for transmission.

16. The communication system of claim 15, wherein the router, responsive to initiation of a SEND module, generates an Interface Control Block as a message header to format the message for transmission.

17. The communication system of claim 13, wherein each EMS, responsive to the message exceeding a nominal limit, subdivides the message into message segments and formats the message segments for separate transmission.

18. The communication system of claim 13, wherein each EMS includes a plurality of communication agents, with each communication agent being adapted to connect the respective EMS to communication devices corresponding to the communication agent.

19. The communication system of claim 18, wherein each EMS includes a communications manager for connecting the router to the plurality of communication agents for transmitting the messages from the API to at least one of the communication agents.

20. The communication system of claim 13, wherein the transmitting application/process sends the messages through its corresponding EMS and through a network protocol to another EMS of the receiving application/process.

* * * * *